(12) United States Patent
Yuan et al.

(10) Patent No.: US 10,408,986 B2
(45) Date of Patent: Sep. 10, 2019

(54) OPTICAL WAVEGUIDE AND LAMP INCLUDING SAME

(71) Applicant: CREE, INC., Durham, NC (US)

(72) Inventors: Zongjie Yuan, Libertyville, IL (US);
Kurt S. Wilcox, Libertyville, IL (US);
Eric J. Tarsa, Goleta, CA (US);
Fabian Jean-Daniel Rol, La Verpilliere (FR); James Ibbetson, Santa Barbara, CA (US); Bernd P. Keller, Santa Barbara, CA (US)

(73) Assignee: Ideal Industries Lighting LLC, Sycamore, IL (US)

( * ) Notice: Subject to any disclaimer, the term of this patent is extended or adjusted under 35 U.S.C. 154(b) by 0 days.

(21) Appl. No.: 15/443,660

(22) Filed: Feb. 27, 2017

(65) Prior Publication Data

US 2017/0336554 A1 Nov. 23, 2017

Related U.S. Application Data

(62) Division of application No. 13/839,949, filed on Mar. 15, 2013, now Pat. No. 9,581,751.

(Continued)

(51) Int. Cl.
*F21K 9/23* (2016.01)
*F21K 9/61* (2016.01)
(Continued)

(52) U.S. Cl.
CPC .............. *G02B 6/0046* (2013.01); *F21K 9/23* (2016.08); *F21K 9/61* (2016.08); *G02B 6/009* (2013.01); *G02B 6/0021* (2013.01); *G02B 6/0028* (2013.01); *G02B 6/0031* (2013.01); *G02B 6/0035* (2013.01); *G02B 6/0036* (2013.01);
(Continued)

(58) Field of Classification Search
CPC ........ F21K 9/233; F21V 7/0091; F21V 5/046; F21S 8/026
See application file for complete search history.

(56) References Cited

U.S. PATENT DOCUMENTS 2,179,161 A * 11/1939 Anderson ................. F21S 8/04
362/291
5,897,201 A * 4/1999 Simon ....................... F21V 5/00
362/147

(Continued)

OTHER PUBLICATIONS

U.S. Appl. No. 13/840,563, filed Mar. 15, 2013, entitled: Optical Waveguide and Luminaire Incorporating Same.

*Primary Examiner* — Alexander K Garlen
(74) *Attorney, Agent, or Firm* — Myers Bigel, P.A.

(57) ABSTRACT

An optical waveguide includes a body of optically transmissive material having a width substantially greater than an overall thickness thereof and including a first side, a second side opposite the first side, a central bore extending between the first and second sides and adapted to receive a light emitting diode, and extraction features on the second side. A light diverter extends into the central bore for diverting light into and generally along the width of the body of material. The extraction features direct light out of the first side and wherein at least one extraction feature has an extraction surface dimension transverse to the thickness that is between about 5% and about 75% the overall thickness of the body of material.

39 Claims, 42 Drawing Sheets

Related U.S. Application Data

(60) Provisional application No. 61/758,660, filed on Jan. 30, 2013.

(51) Int. Cl.
*F21V 8/00* (2006.01)
*F21Y 101/00* (2016.01)
*F21Y 115/10* (2016.01)

(52) U.S. Cl.
CPC ......... *G02B 6/0038* (2013.01); *G02B 6/0041* (2013.01); *G02B 6/0043* (2013.01); *G02B 6/0058* (2013.01); *G02B 6/0061* (2013.01); *F21Y 2101/00* (2013.01); *F21Y 2115/10* (2016.08); *G02B 6/0088* (2013.01)

(56) References Cited

U.S. PATENT DOCUMENTS

| | | | |
|---|---|---|---|
| 6,474,846 B1 * | 11/2002 | Kelmelis | F21V 17/164 248/231.91 |
| 7,111,969 B2 * | 9/2006 | Bottesch | B60Q 1/0052 362/517 |
| 7,665,865 B1 | 2/2010 | Hulse et al. | |
| 9,389,367 B2 | 7/2016 | Yuan et al. | |
| 9,823,408 B2 | 11/2017 | Yuan et al. | |
| 2004/0183774 A1 | 9/2004 | Manabe et al. | |
| 2009/0196071 A1 * | 8/2009 | Matheson | G02B 6/0021 362/623 |
| 2010/0202142 A1 * | 8/2010 | Morgan | F21S 11/00 362/235 |
| 2011/0063855 A1 * | 3/2011 | Vissenberg | G02B 6/0021 362/311.12 |
| 2011/0149581 A1 * | 6/2011 | Jiang | F21V 3/04 362/338 |
| 2012/0236595 A1 | 9/2012 | Parker et al. | |
| 2012/0268930 A1 * | 10/2012 | Lu | F21V 5/007 362/235 |
| 2012/0287665 A1 | 11/2012 | Hyakuta et al. | |
| 2013/0038195 A1 | 2/2013 | Petroski et al. | |
| 2014/0133172 A1 | 5/2014 | Vissenberg et al. | |

* cited by examiner

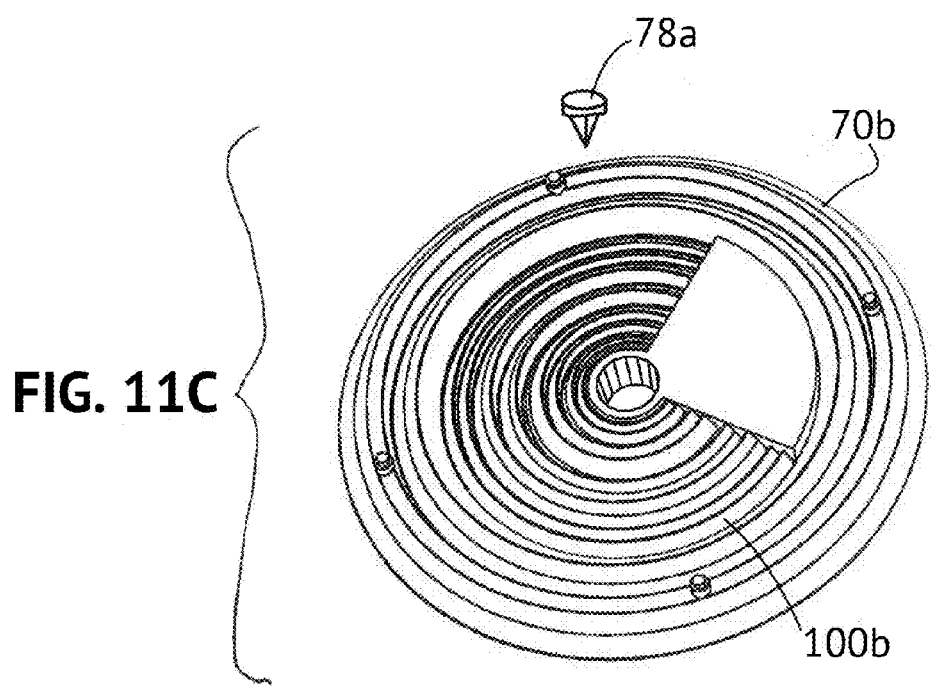

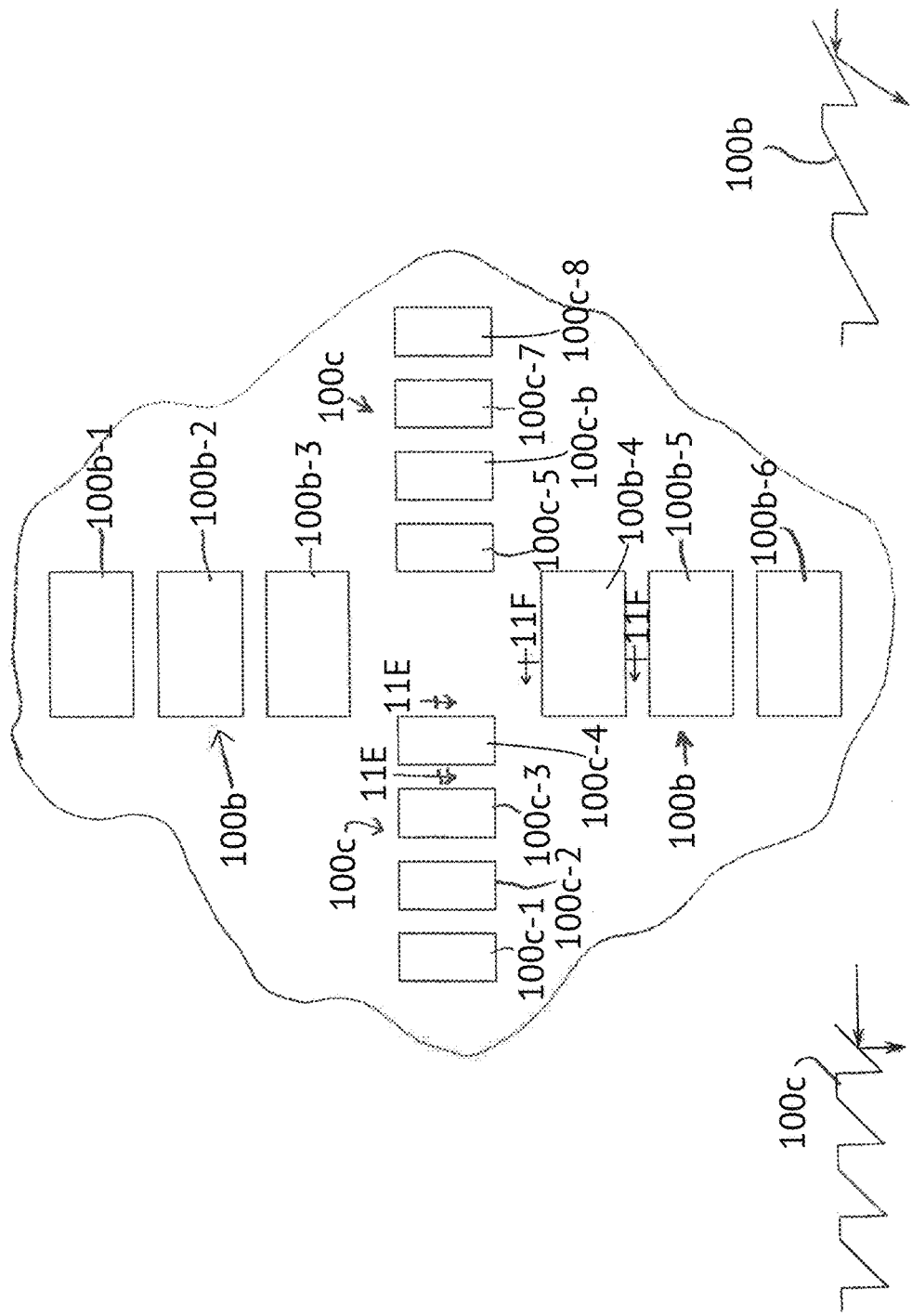

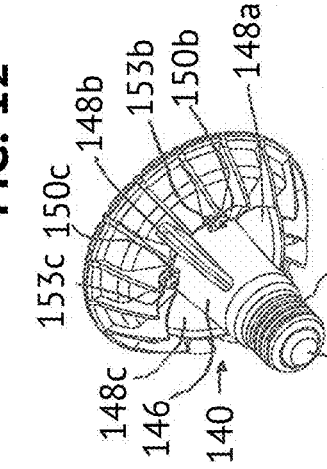
FIG. 12
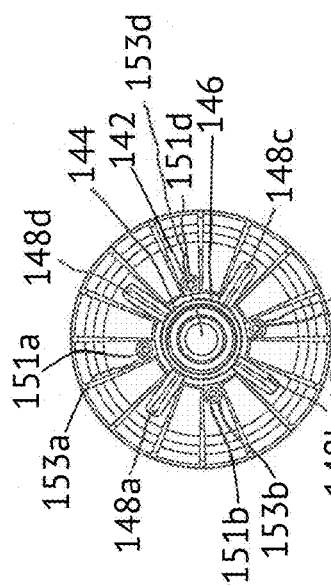
FIG. 17
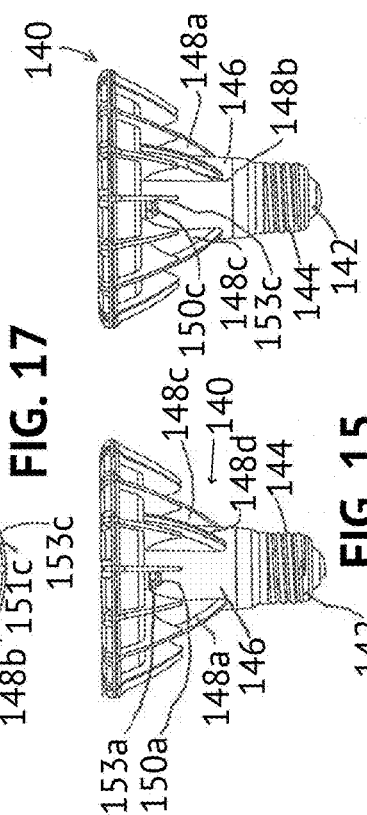
FIG. 14
FIG. 15
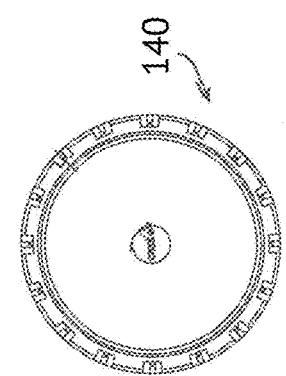
FIG. 16
FIG. 13

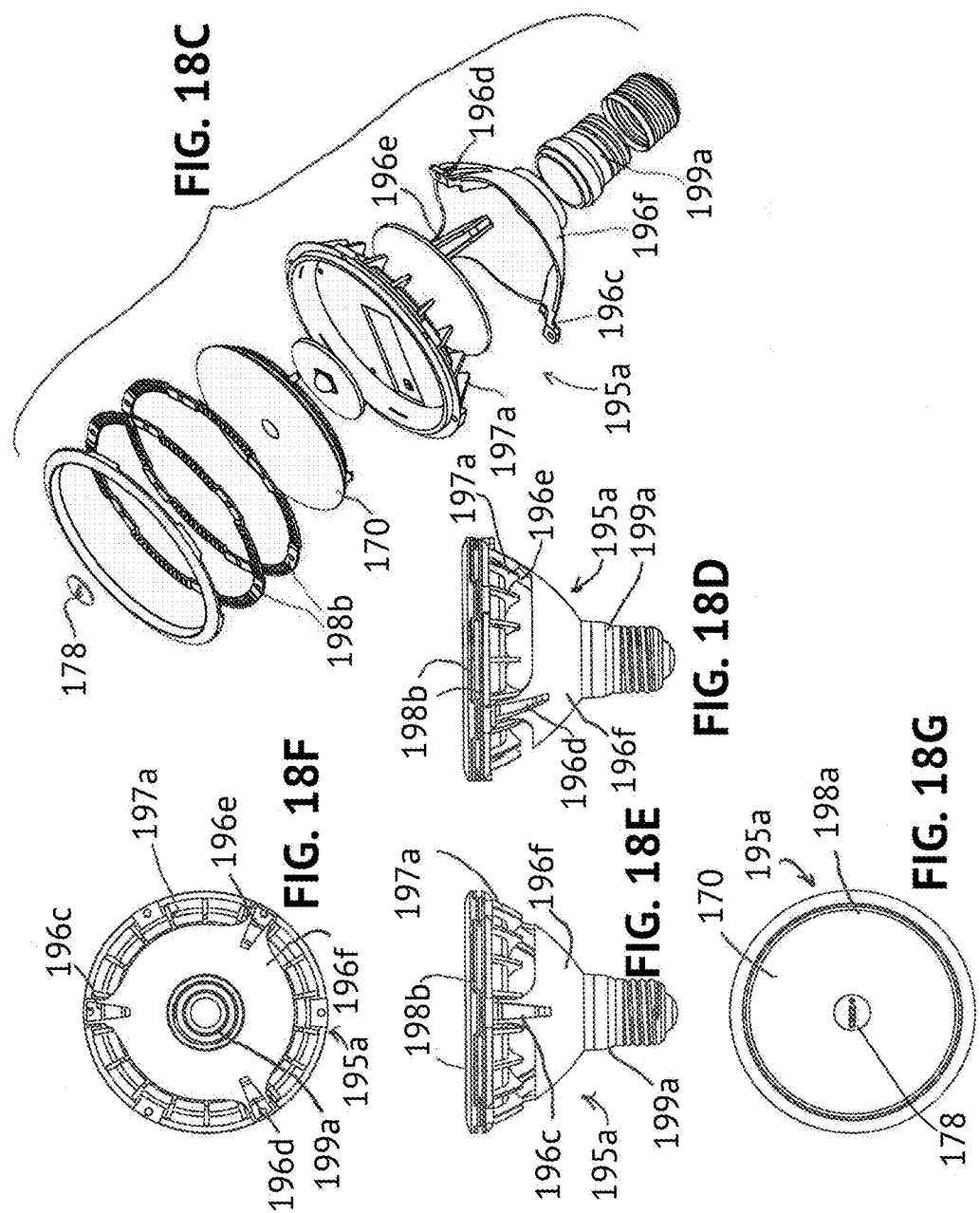

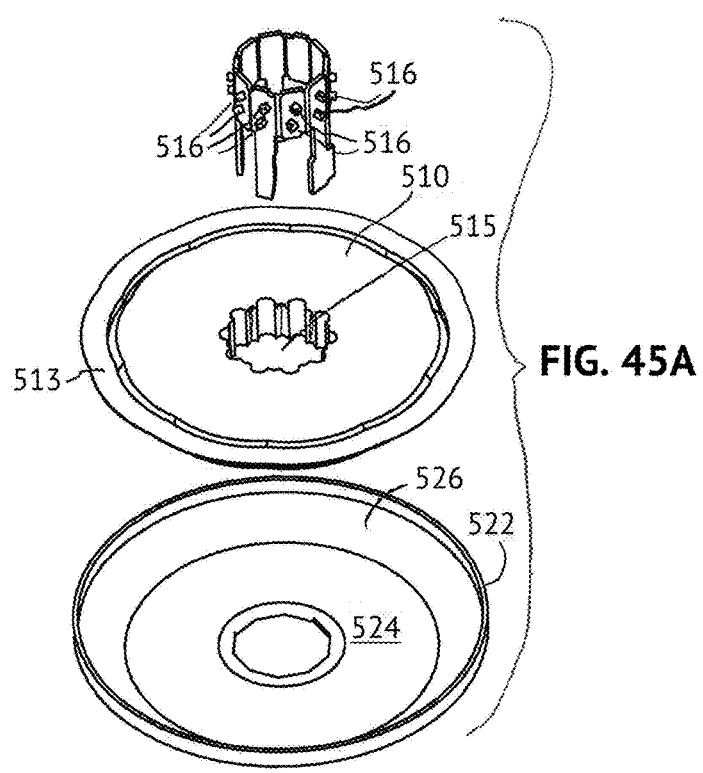

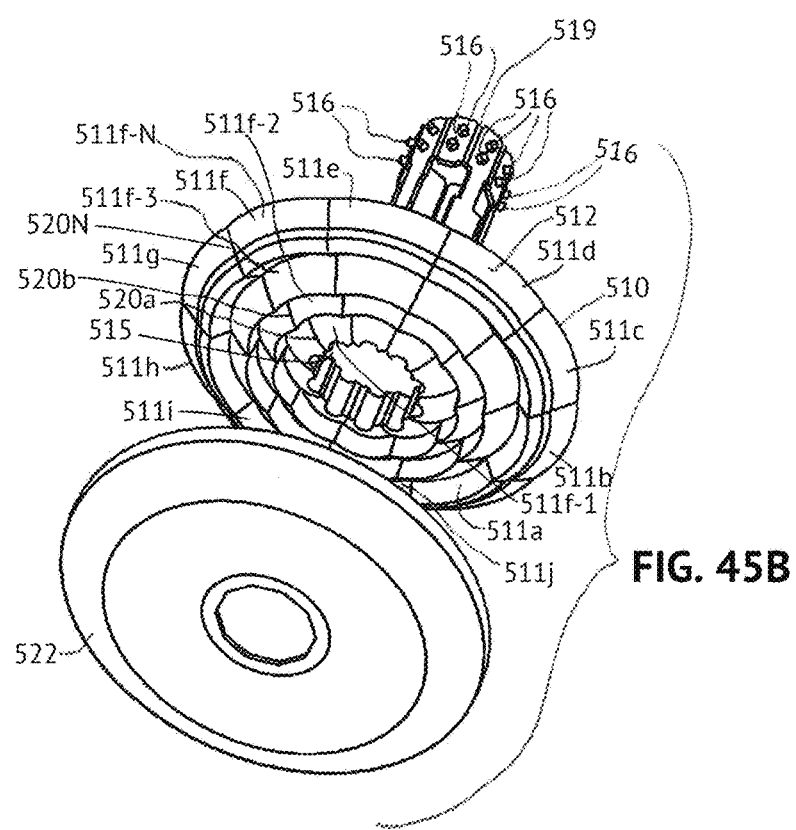

OPTICAL WAVEGUIDE AND LAMP INCLUDING SAME

CROSS REFERENCE TO RELATED APPLICATIONS

This divisional patent application claims the benefit of U.S. patent application Ser. No. 13/839,949, filed Mar. 15, 2013, entitled "Optical Waveguide and Lamp Including Same", which claims the benefit of U.S. Provisional patent application Ser. No. 61/758,660, filed Jan. 30, 2013, entitled "Optical Waveguide", both owned by the assignee of the present application, and the disclosures of which are incorporated by reference herein.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present inventive subject matter relates to optical waveguides, and more particularly to optical waveguides for general lighting.

2. Background of the Invention

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material which defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

Shipman, U.S. Pat. No. 3,532,871 discloses a combination running light reflector having two light sources, each of which, when illuminated, develops light that is directed onto a polished surface of a projection. The light is reflected onto a cone-shaped reflector. The light is transversely reflected into a main body and impinges on prisms that direct the light out of the main body.

Simon U.S. Pat. No. 5,897,201 discloses various embodiments of architectural lighting that is distributed from contained radially collimated light. A quasi-point source develops light that is collimated in a radially outward direction and exit means of distribution optics direct the collimated light out of the optics.

SUMMARY OF THE INVENTION

According to one aspect of the present invention, an optical waveguide includes a body of optically transmissive material having a width substantially greater than an overall thickness thereof and including a first side, a second side opposite the first side, a central bore extending between the first and second sides and adapted to receive a light emitting diode, and extraction features on the second side. A light diverter extends into the central bore for diverting light into and generally along the width of the body of material. The extraction features direct light out of the first side and at least one extraction feature has an extraction surface dimension transverse to the thickness that is between about 5% and about 75% of the overall thickness of the body of material.

Other aspects and advantages of the present invention will become apparent upon consideration of the following detailed description and the attached drawings.

BRIEF DESCRIPTION OF THE DRAWINGS

FIGS. 11B and 11C are isometric views of non-circular and asymmetric waveguides, respectively;

FIG. 11D is a diagrammatic elevational view of an asymmetric waveguide;

FIGS. 11E and 11F are cross sectional views taken generally along the lines 11E-11E and 11F-11F, respectively, of FIG. 11D;

FIG. 12 is an isometric view of a first end of a second lamp incorporating a waveguide according to a second embodiment of the present invention;

FIG. 13 is a first end elevational view of the lamp of FIG. 12;

FIG. 14 is a first side elevational view of the lamp of FIG. 12;

FIG. 15 is a second side elevational view of the lamp of FIG. 12;

FIG. 16 is a second end isometric view of the lamp of FIG. 12;

FIG. 17 is a second end elevational view of the lamp of FIG. 12;

FIG. 18C is an exploded isometric view of yet another lamp;

FIG. 18D is a side elevational view of the lamp of FIG. 18C as assembled;

FIG. 18E is a front elevational view of the lamp of FIG. 18D;

FIG. 18F is a bottom elevational view of the lamp of FIG. 18D;

FIG. 18G is a top plan view of the lamp of FIG. 18D;

FIGS. 45A and 45B are exploded isometric views of the light assembly of FIG. 43.

DETAILED DESCRIPTION OF THE PREFERRED EMBODIMENTS

Figure 1:
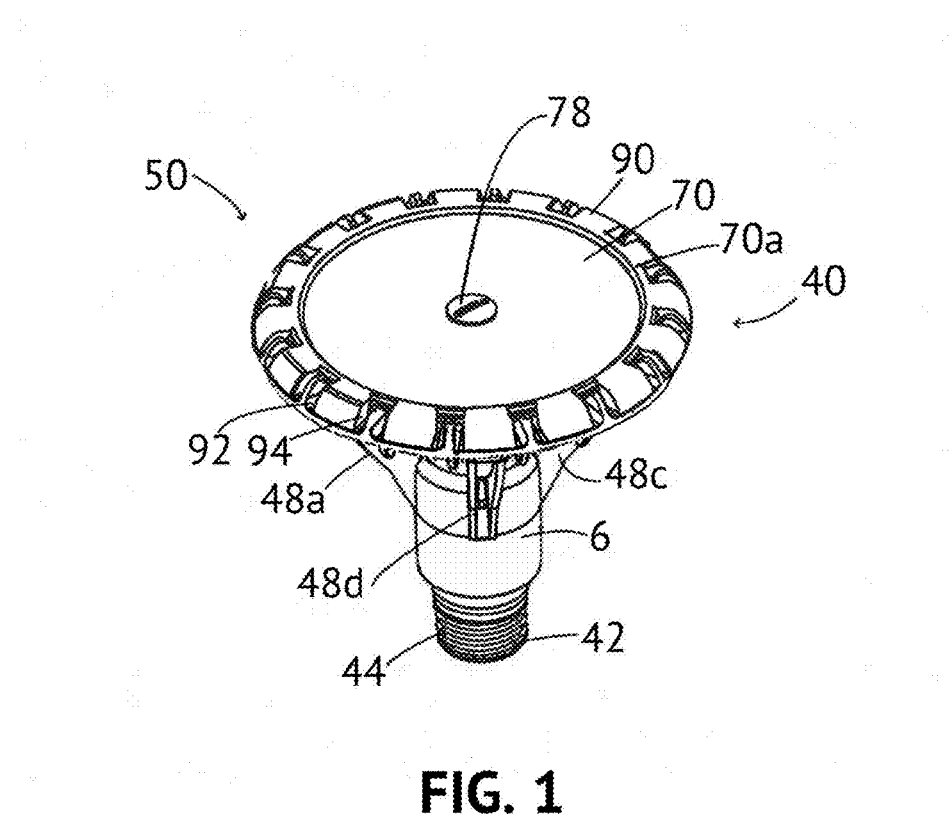
FIG. 1 is an isometric view of a first end of a first lamp incorporating a waveguide according to a first embodiment of the present invention.

Referring first to FIGS. 1-8, a lamp 40 includes a base 42 at which an Edison-style plug 44 is disposed. Extending away from the base 42 is a central body 46. Four arms 48a-48d extend away from the central body 46. A light assembly 50 is disposed on ends of the arms 48a-48d and is secured thereto by any suitable means, such as three screws 51 or other fasteners (shown in FIGS. 5 and 7) that extend through holes in the ends of the arms 48a-48c into threaded bores of the light assembly 50.

Figure 6:
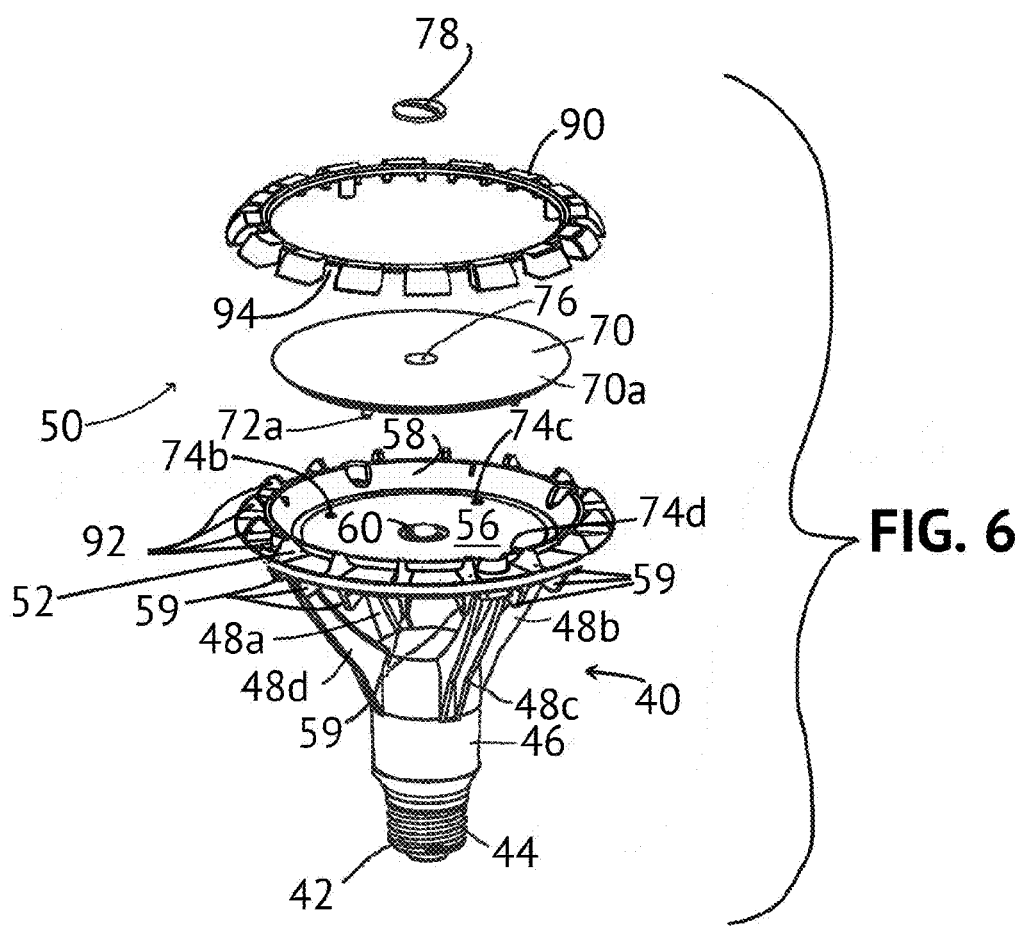
FIG. 6 is an exploded isometric first end view of the lamp of FIG. 1.
Figure 7:
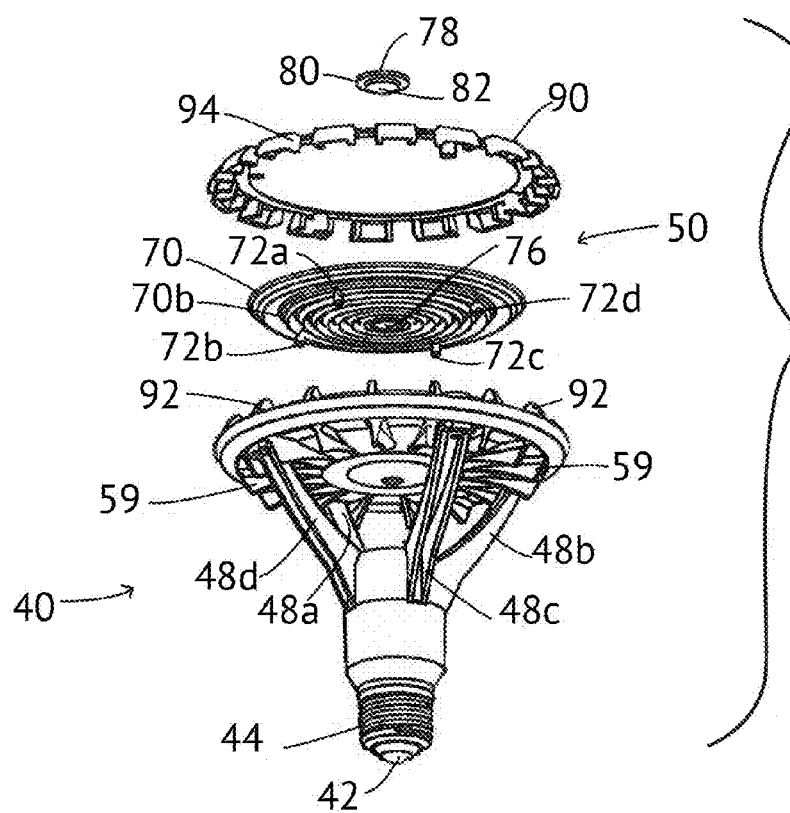
FIG. 7 is an exploded isometric second end view of the lamp of FIG. 1.
Figure 8:
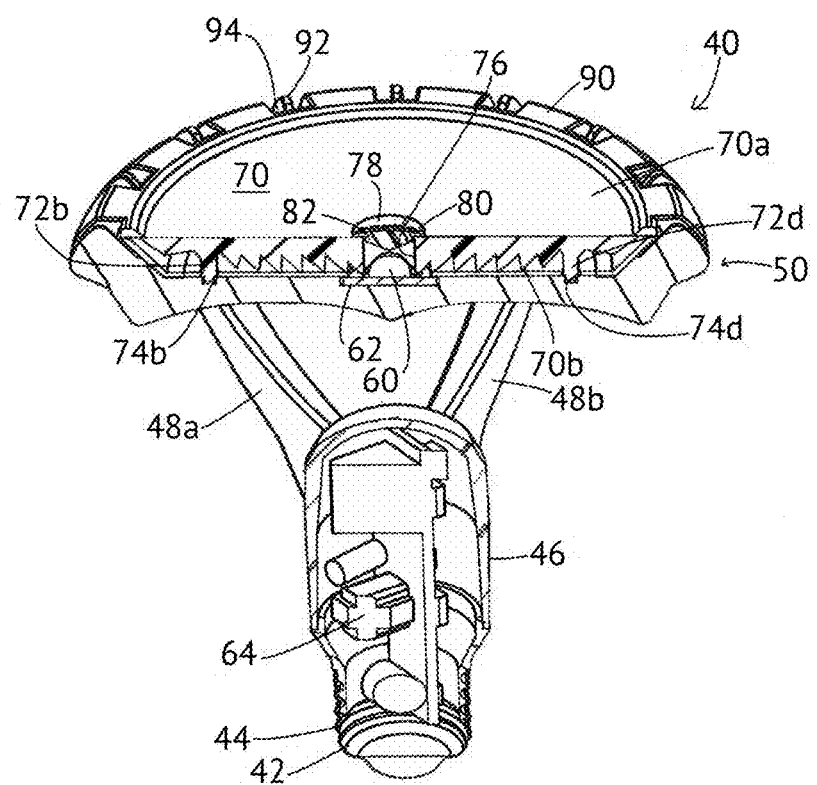
FIG. 8 is a sectional isometric view of the lamp of FIG. 1.

As seen in FIGS. 6 and 8, the light assembly 50 includes a base element in the form of a heat exchanger 52 having a central recess 54 defined by a base surface 56 and a tapered circumferential wall 58. The heat exchanger 52 is made of any suitable heat conductive material, such as aluminum, and includes a plurality of heat exchanger fins 59 (FIGS. 3-7) on a side thereof opposite the central recess 54. Further, if desired, the base surface 56 and/or the tapered circumferential wall 58 may be covered or coated by a reflective material, which may be a white material or a material that exhibits specular reflective characteristics. A light source that may include one or more light emitting diodes (LEDs) 60 (seen in FIG. 8) is mounted on a support member 62 comprising a heat conductive substrate, such as a metal circuit board, and extends beyond the base surface 56. The LED 60 may be a white LED or may comprise multiple LEDs either mounted separately or together on a single substrate or package including a phosphor-coated LED either alone or in combination with a color LED, such as a green LED, etc. In those cases where a soft white illumination is to be produced, the light source 60 typically includes a blue shifted yellow LED and a red LED. Different color temperatures and appearances could be produced using other LED combinations, as is known in the art. In one embodiment, the light source comprises any LED, for example, an MT-G LED incorporating TrueWhite® LED technology as developed and manufactured by Cree, Inc., the assignee of the present application. In any of the embodiments disclosed herein the LED(s) may each have a directional emission distribution (e.g., a side emitting or other distribution or a lambertian distribution), as necessary or desirable.

The light source 60 is operated by control circuitry 64 in the form of a driver circuit (seen in FIG. 8) disposed in the central body 46 that receives AC power via the Edison-style plug. The control circuitry 64 may be potted within the central body 46. Wires or conductors extend through one or more of the arms 48a-48d from the control circuitry 64 to the light source 60. In the illustrated embodiment, wires extend through the arm 48d into the light assembly 50. A cover 66 (FIG. 5) may be disposed in or over the arm 48d to provide a passage for the wires. The control circuitry 64 is designed to operate the light source 60 with AC or DC power in a desired fashion to produce light of a desired intensity and appearance. The heat exchanger 52 is preferably arranged to eliminate thermal crosstalk between the LEDs and the control circuitry. Preferably, the light source 60 develops light appropriate for general illumination purposes including light similar or identical to that provided by an incandescent, halogen, or other lamp that may be incorporated in a down light, a light that produces a wall washing effect, a task light, a troffer, or the like.

Figure 2:
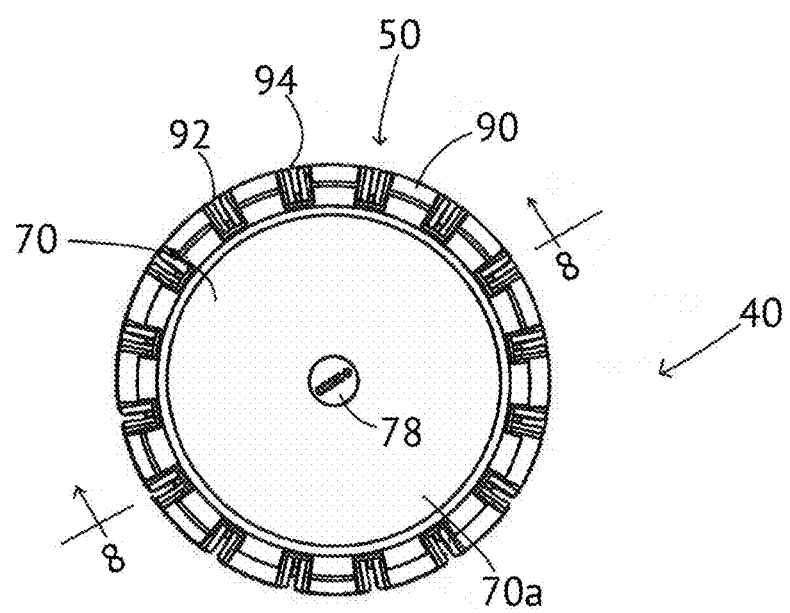
FIG. 2 is a first end elevational view of the lamp of FIG. 1.
Figure 3:
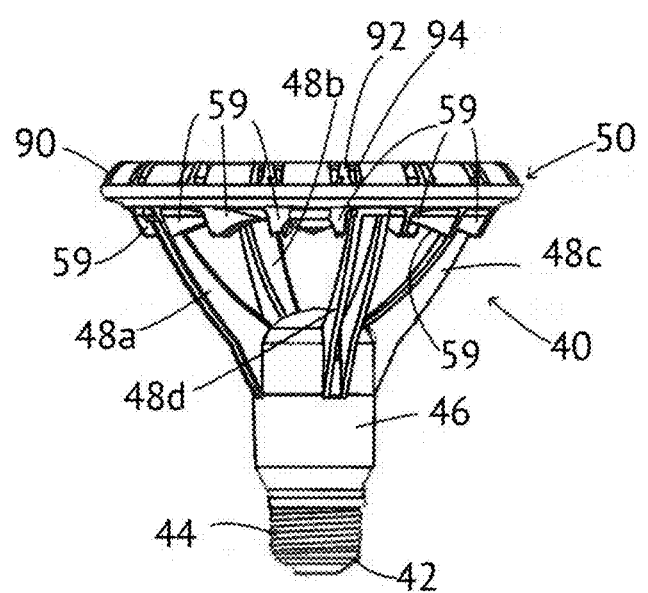
FIG. 3 is a side elevational view of the lamp of FIG. 1.
Figure 4:
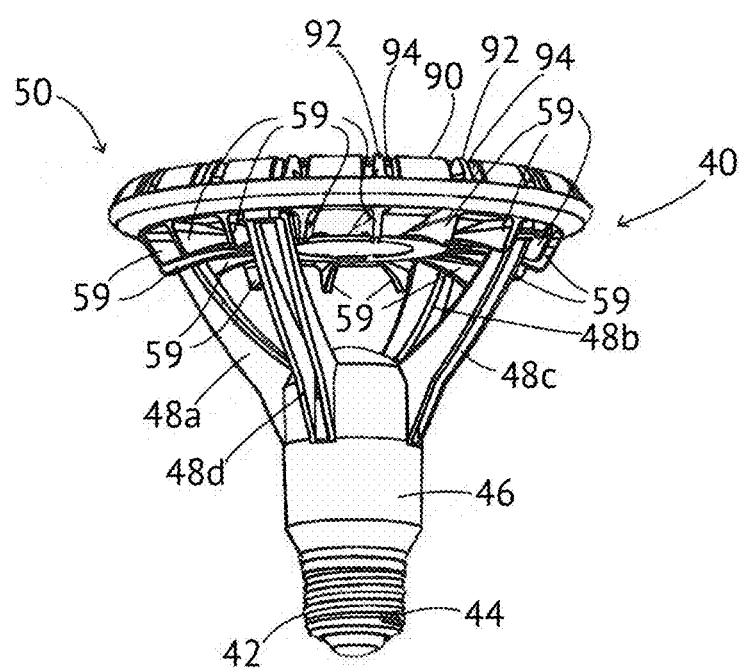
FIG. 4 is an isometric view of a second end of the lamp of FIG. 1.
Figure 5:
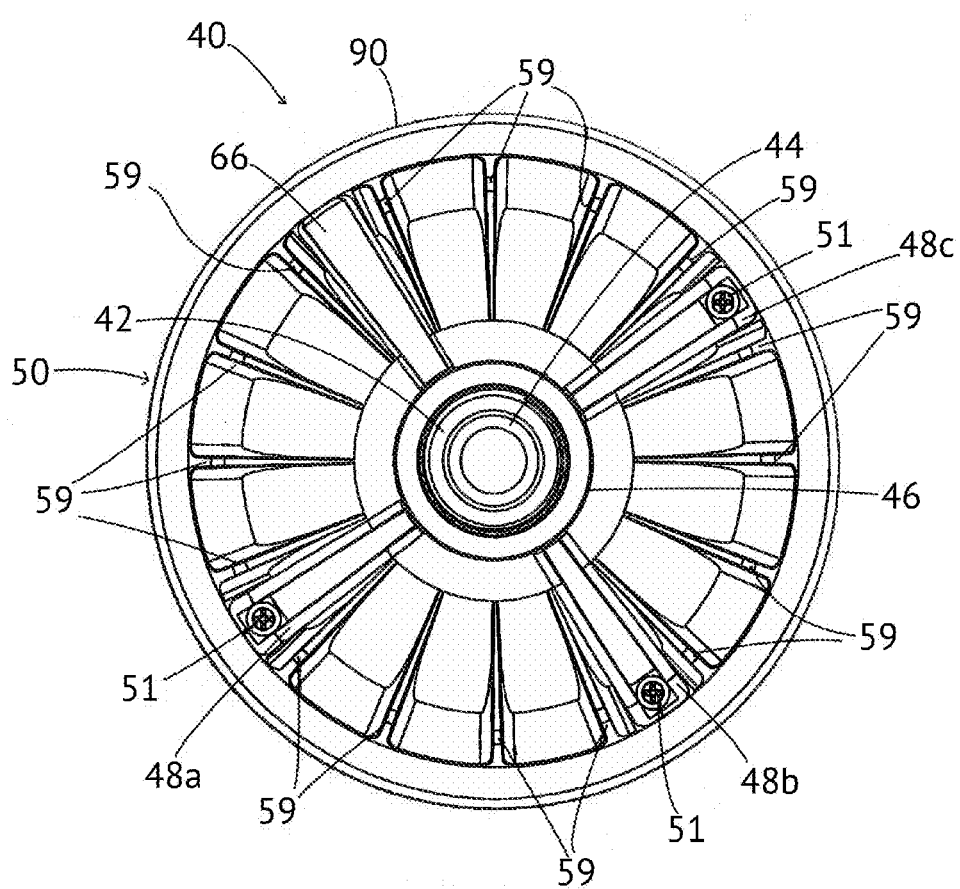
FIG. 5 is a second end elevational view of the lamp of FIG. 1.

A waveguide 70 has a main body of material 71 (FIG. 11) having a width substantially greater than an overall thickness thereof and is substantially or completely circular in a dimension transverse to the width and thickness (FIG. 2). The waveguide 70 is disposed in contact with the base surface 56 and the tapered circumferential wall 58 and is located by four location pins 72a-72d (FIG. 7) that are disposed in corresponding blind bores 74a-74d (only the bores 74b-74d are visible in FIGS. 6 and 8). In the illustrated embodiment, the waveguide 70 includes a first or outer side or surface 70a, a second opposite inner side or surface 70b, and an interior coupling cavity comprising a central bore 76 that in the illustrated embodiment extends fully through the waveguide 70 from the first side to the second side. Also in the illustrated embodiment, the walls defining the central bore 76 are normal to the first and second sides 71a, 71b of the waveguide 70 and the central bore 76 is coaxial with an outer surface of the main body of material 71. In all the embodiments disclosed herein, the central bore is preferably polished and optically smooth. Also preferably, the light source 60 extends into the central bore 76 from the second side thereof. Also in the illustrated embodiment, a light diverter of any suitable shape and design, such as a conical plug member 78 extends into the central bore 76 from the first side thereof. Referring specifically to FIGS. 7 and 8, in the illustrated embodiment, the conical plug member 78 includes a base flange 80 that is secured by any suitable means, such as an adhesive, to an outer surface of the waveguide 70 such that a conical portion 82 extends into the central bore 76. If desired, the base flange 80 may be omitted and the outer diameter of the plug member may be slightly greater than the diameter of the bore 76 whereupon the plug member 78 may be press fitted or friction fitted into the bore 76 and/or secured by adhesive or other means. Still further, if desired, the conical plug member 78 may be integral with the waveguide 70 (see FIG. 47) rather than being separate therefrom. Further, the light source 60 may be integral with the waveguide 70, if desired. In the illustrated embodiment, the plug member 78 may be made of white polycarbonate or any other suitable material, such as acrylic, molded silicone, polytetrafluoroethylene (PTFE), Delrin® acetyl resin, or any suitable metal. The material may be coated with reflective silver or other metal or material using any suitable application methodology, such as a vapor deposition process. The plug member 78 may be any other suitable shape, including a symmetric or asymmetric shape, as desired. For example, the plug member may be non-conical and may have a substantially flat shape, a segmented shape, an inclined shape to direct light out a particular side of the lamp 40, etc.

The waveguide 70 may be secured in any suitable fashion and by any suitable means to the heat exchanger 52. In the illustrated embodiment, a ring member 90 is retained on surfaces of the heat exchanger 52 such that ribs 92 of the heat exchanger 52 are disposed in recesses 94 of the ring member 90. This securement is accomplished by the screws 51, which may extend into threaded bosses (not shown) carried on an inner surface of the ring member 90. In addition the ring member 90 bears against that outer surface of the waveguide 70 so that the waveguide 70 is secured in place.

Figure 11B:
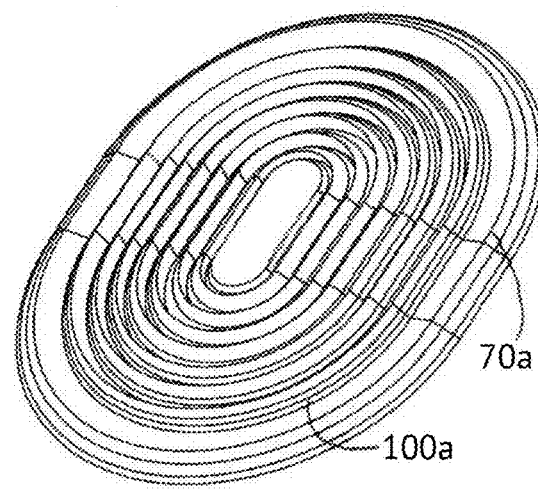
Figure 11:
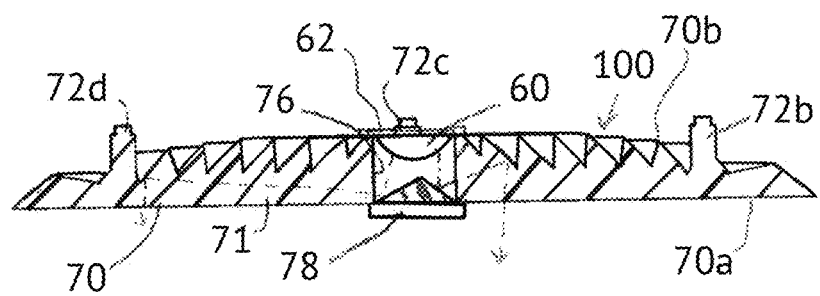
FIG. 11 is a cross sectional view of the waveguide of FIG. 1 taken generally along the lines 11-11 of FIG. 10.

In the illustrated embodiment the lamp 40 has a size and outer envelope equivalent to a PAR 38 lamp, and can be used in any luminaire that can accommodate same. It should be noted that the lamp 40 could be made larger or smaller to fit inside other luminaires and/or to satisfy particular lighting requirements. One example of a luminaire with which the lamp 40 could be used is a downlight mounted, for example, in a ceiling. In such a case, the plug 44 of the lamp 40 is screwed into an Edison-style socket in the luminaire such that the light source 60 points downwardly (i.e., the lamp 40 is oriented opposite to the orientation of FIG. 3 such that the plug 44 is above the waveguide 70.) FIG. 11 illustrates the waveguide 70 in such orientation with the light source 60 disposed above the plug member 78. When the light source 60 is energized, light developed by the source 60 travels within the bore 76 and reflects off the surface of the conical portion 82. Preferably, the conical portion 82 is made of or the surface is coated with a white or specular material that is highly reflective such that the great majority of light incident thereon (preferably, although not necessarily, greater than 95%) is reflected into the waveguide 70 in a generally transverse direction along the width of the body of material 71. Examples of such reflected light rays are shown in FIG. 11. Alternatively, the plug member 78 may be partially or fully transparent or translucent, as desired, to allow at least some light to be transmitted therethrough (for example, at least about 5% of the light may be transmitted through the plug member 78). In any event, the spacing, number, size and geometry of extraction features 100 determine the mixing and distribution of light in the waveguide 70 and light exiting the waveguide 70. In the illustrated embodiment, the extraction features 100 comprise a series of ridges separated by intervening troughs at least some of which define one or more inverted V-shapes. Also in the illustrated embodiment, the extraction features 100 are continuous (i.e., they extend fully in a continuous manner about the central bore 76), are coaxial with the central bore, and therefore symmetric about the central axis of the central bore 76. In addition to the foregoing, the waveguide 70 is tapered from the center of the waveguide to an outside edge in the sense that there is less material at the radially outside edges of the waveguide than at the center. Such tapering may be effectuated by providing extraction features that become deeper and/or are more widely separated with distance from the center of the waveguide, as noted in greater detail hereinafter. The tapering maximizes the possibility that substantially all the light introduced into the waveguide 70 is extracted over a single pass of the light through the waveguide. This results in substantially all of the light striking the radially outward surfaces of the extraction features 100, which are carefully controlled so that the extraction of light is also carefully controlled. The combination of tapering with the arrangement of extraction features and use of efficient coupling components including the plug member 78 disposed in the bore 76 with the light source 60 together result in improved color mixing with minimum waveguide thickness and excellent control over the emitted light.

In the illustrated embodiment, the light emitted out the waveguide 70 is mixed such that point sources of light in the source 60 are not visible to a significant extent and the emitted light is controlled and collimated to a high degree.

Figure 11A:
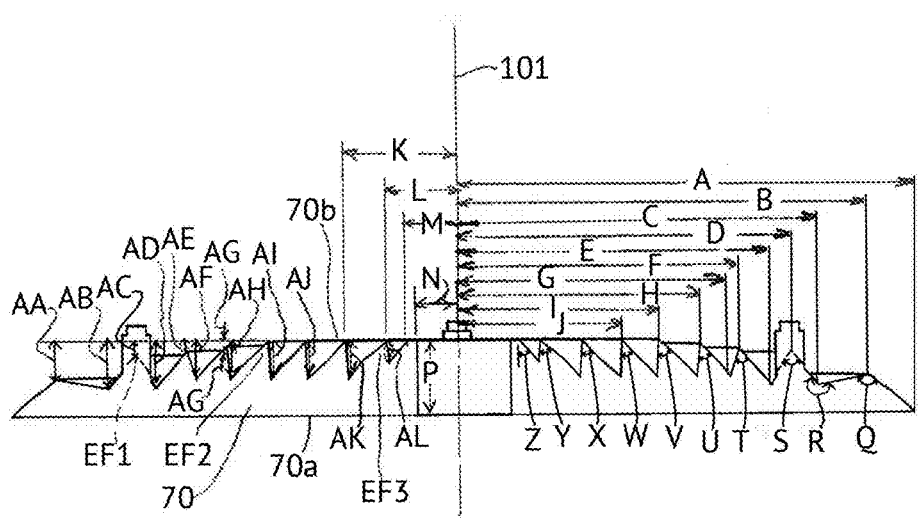
FIG. 11A is a view identical to FIG. 11 identifying sample dimensions of the waveguide of FIG. 1.

In the illustrated embodiment, the waveguide is made of optical grade acrylic, polycarbonate, molded silicone, glass, or any other optical grade material and, in one example, has the dimensions noted in the following table and as seen in FIG. 11A. It should be noted that the dimensions in the following table as exemplary only and not limiting (several of the dimensions are taken with respect to a center line 101 (FIG. 11A) of the waveguide 70):

TABLE 1

| REFERENCE (FIG. 11A) | NOMINAL DIMENSION (Millimeters - unless otherwise specified) |
|---|---|
| A | 48.500 |
| B | 43.600 |
| C | 38.100 |
| D | 35.100 |
| E | 33.100 |
| F | 29.700 |
| G | 28.700 |
| H | 25.500 |
| I | 21.000 |
| J | 17.000 |
| K | 12.700 |
| L | 8.000 |
| M | 6.000 |
| N | 5.000 |
| P | 8.000 |
| Q | 132.8° |
| R | 241.7° |
| S | 70.7° |
| T | 58.8° |
| U | 51.5° |
| V | 50.6° |
| W | 46.4° |
| X | 47.1° |
| Y | 56.2° |
| Z | 42.3° |
| AA | 4.000 |
| AB | 5.000 |
| AC | 1.500 |
| AD | 5.000 |
| AE | 1.000 |
| AF | 4.000 |
| AG | 0.500 |

TABLE 1-continued

| REFERENCE (FIG. 11A) | NOMINAL DIMENSION (Millimeters - unless otherwise specified) |
|---|---|
| AH | 4.000 |
| AI | 4.000 |
| AJ | 4.000 |
| AK | 4.000 |
| AL | 2.000 |

From the foregoing dimensions one can calculate extraction feature aspect ratios as follows:

$$\text{Aspect Ratio} = \text{Width of ridge}/\text{Greatest height extent of ridge} \quad (1)$$

Using the foregoing equation, one can calculate (at least approximately) aspect ratios $AR1$, $AR2$, and $AR3$ of various extraction features $EF1$, $EF2$, and $EF3$ denoted in FIG. 11A as follows:

$$AR1=(C-E)/(AB-AC)=(38.1-33.1)/(5.0-1.5)=5.0/3.5=1.43 \quad (2)$$

$$AR2=(H-I)/AI=(25.5-21.0)/4.0=4.5/4.0=1.125 \quad (3)$$

$$AR3=(K-L)/AK=(12.7-8.0)/4.0=4.7/4=1.175 \quad (4)$$

In the illustrated embodiment, the waveguide 70 may be designed to create a beam angle that preferably is between less than about 5 degrees to greater than 60 degrees, and more preferably is between about 5 degrees and about 50 degrees and most preferably between about 6 degrees and about 40 degrees. The beam peak can either be centered in the nadir (as in a PAR application) or off-center (as in an outdoor application). The beam angle and/or peak can be controlled through appropriate design of the waveguide 70. In the illustrated embodiment of FIG. 11A, the beam angle is about 12 degrees.

In any of the embodiment disclosed herein, the extraction features may be similar or identical to one another in shape, size, and/or pitch, or may be different from one another in any one or more of these parameters, as desired.

If desired, the extraction features 100 may be other than circular, asymmetric and/or discontinuous. FIG. 11B illustrates a racetrack-shaped waveguide 70*a* with racetrack-shaped extraction features 100*a*. FIG. 11C shows a circular waveguide 70*b* with asymmetric and discontinuous extraction features 100*b*. An asymmetric plug member 78*a* that may be used with the waveguide 70*b* is illustrated in FIG. 11C. Asymmetric extraction features may be used with or without an asymmetric plug member to obtain multiple beam distributions. For example, as seen in FIG. 11D, a first set of discrete extraction features 100*b* disposed in discrete boundaries 100*b*-1 through 100*b*-6 may direct light toward a first direction and at least a second set of extraction features 100*c* disposed in discrete boundaries 100*c*-1 through 100*c*-8 may direct light toward at least a second direction with each of the at least two directed beams having substantially identical or different beam widths and/or intensities. FIGS. 11E and 11F illustrate different extraction features that may accomplish this result. In a still further example seen in FIGS. 36-38, the extraction features 100 may comprise a plurality of discrete prisms 102 formed in a lower surface (as seen in FIGS. 33-39) of a waveguide main body 103 and arranged in concentric rings. As in the previous embodiment, the light source 60 and the plug member 78 extend into a central bore 76. The waveguide main body 103 is disposed on a substrate 104 that may have a reflective coating thereon and light developed by the light source 60 is diverted transversely into the main body 103 and is emitted out a surface 105 by the prisms 102. The prisms may be identical or not identical to one another. Preferably, the prisms face the coupling cavity comprising the central bore 76.

Figure 39:
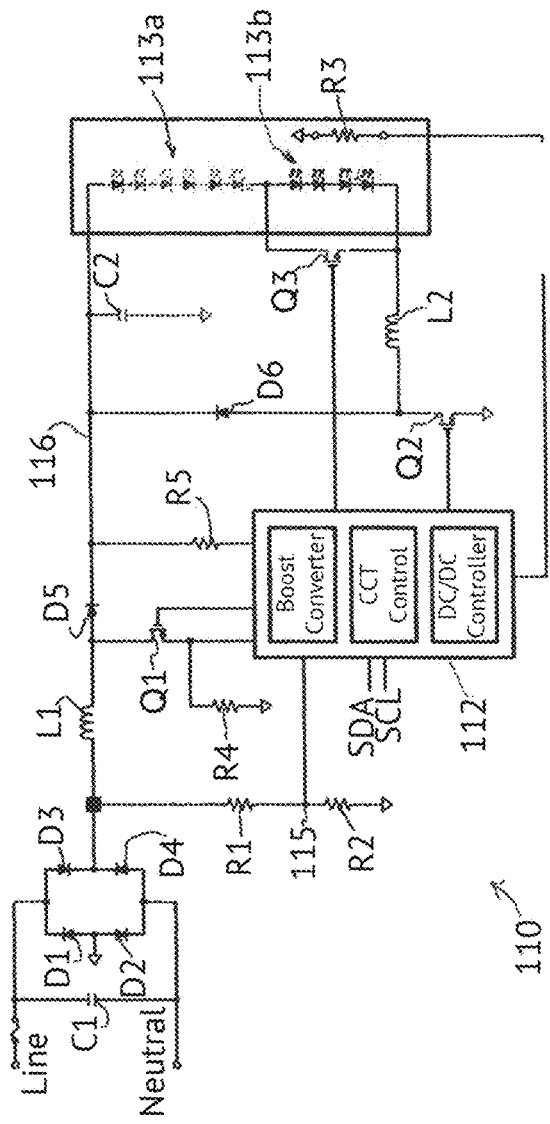
FIG. 39 is a schematic diagram of a driver circuit suitable for developing power for the LED(s) of FIGS. 1-8.

FIG. 39 is a schematic diagram of a driver circuit 110 suitable for developing power for the LED(s) and which may be used as the circuitry 64. The driver circuit 110 is an I²C control that includes an integrated circuit IC 112. The IC 112 and other circuitry operate as a constant current source. The circuit 110 further includes a full-wave rectifier circuit including diodes D1-D4 coupled to a capacitor C1 and filter elements comprising inductors L1 and L2 and a capacitor C2. A diode D5 effectuates unidirectional charging of the capacitor C. The circuit 110 operates as a two-stage regulation circuit that is capable of operating two sets of LEDs 113a, 113b in a controllable dimming fashion in response to a dimming command signal SDA delivered to an input of the IC 112 by a dimmer (not shown). In the illustrated embodiment, each of the LEDs 113a is capable of developing white light, and each of the LEDs 113b is capable of producing temperature-compensated red light that adds warmth to the white light developed by the LEDs 113a. The two sets of LEDs 113a, 113b may be disposed on a single substrate or may be disposed on multiple substrates, as desired.

Two transistors Q1 and Q2 implement the two stage regulation circuit and are operated together with a third transistor Q3 to control the current through the LEDs 113. A diode D6 isolates the transistors Q1 and Q2 from one another. The IC 112 is also responsive to a signal SCL that is factory set and commands a specific maximum constant current magnitude for the LEDs 113. The IC 112 implements a soft-switching controllable boost and buck converter for dimming of the LED(s) 113 that produces low electromagnetic interference (EMI) and no 120 Hz. AC component in the DC power that is supplied to the LEDs 113.

The balance of the circuit 110 includes a voltage divider including resistors R1 and R2 wherein a junction between the resistors R1 and R2 is coupled to an input of the IC 112. A thermistor R3 is disposed in heat transfer relationship with the LEDs 113b and provides a thermal sensing signal that is fed back to an input of the IC 112 whereby the IC 112 regulates the power delivered to the LEDs 113b in dependence upon the sensed temperature to effectuate the temperature compensation of the LEDs 113b. In addition a resistor R4 pulls an input of the IC 112 down when the transistor Q1 is off and a resistor R5 couples a Power_In input of the IC 112 to a DC bus 116. In the illustrated embodiment, the driver circuit 110 is mounted on a single circuit board and is compatible with a wide range of dimmers.

Any other suitable driver circuit may be used as the circuitry 64.

Referring next to FIGS. 12-18, a second embodiment of a lamp 140 is shown. The lamp 140 is intended for use in luminaires that can accommodate PAR 30 bulbs. The lamp 140 includes a base 142 at which an Edison-style plug 144 is disposed. Extending away from the base 142 is a cap 145 (FIG. 18) and a central body 146. The cap 145 is secured in any suitable fashion to the central body 146, such as by ultrasonic welding. Four arms 148a-148d extend away from the central body 146. A light assembly 150 is disposed on ends of the arms 148a-148d and is secured thereto by any suitable means, such as four threaded fasteners 151a-151d that extend through associated bores in associated tabs 153a-153d carried by the central body 146 and into threaded bores (not seen in the FIGS.) of the light assembly 150.

Figure 18:
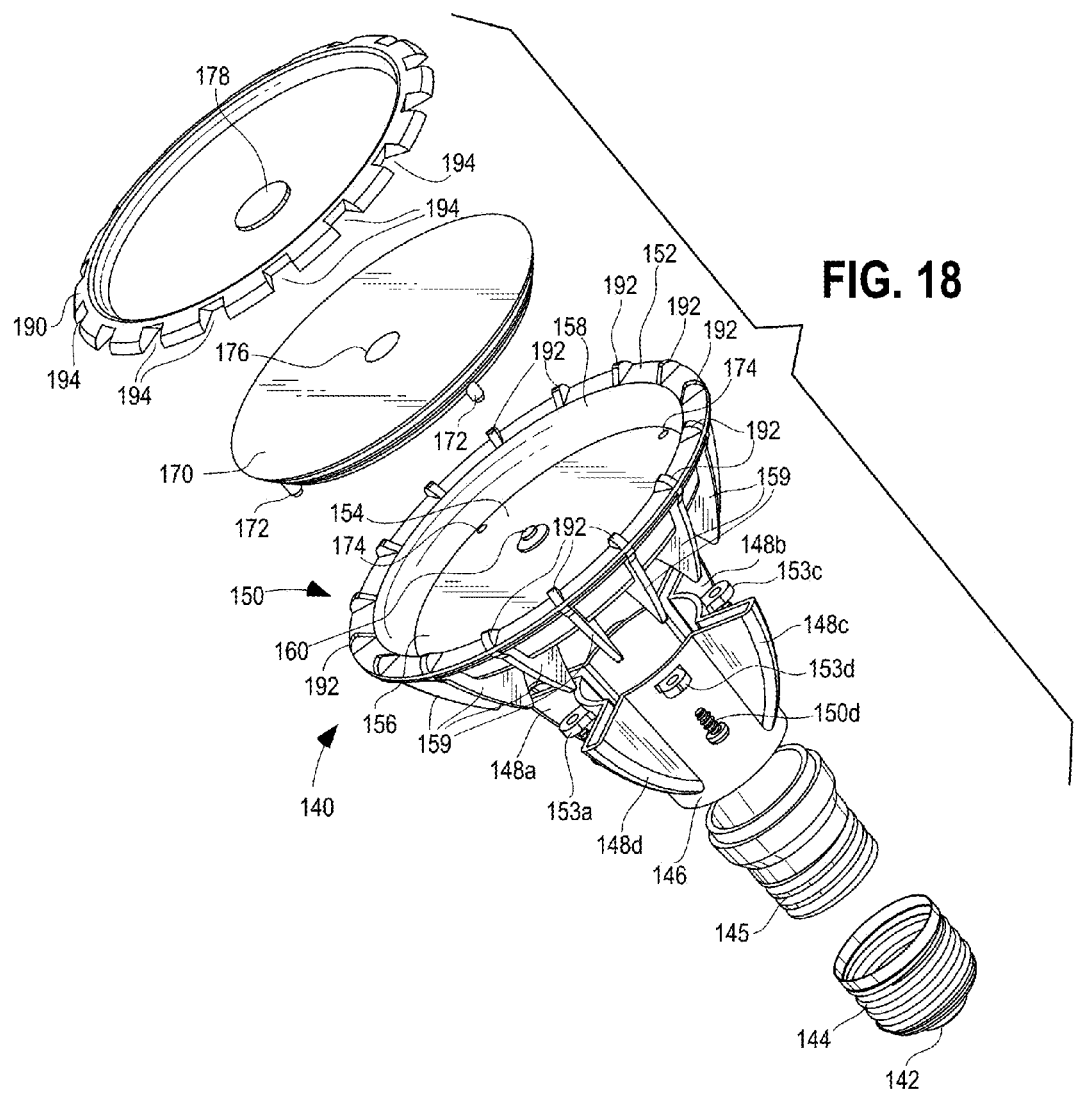
FIG. 18 is an exploded isometric first end view of the lamp of FIG. 12.

As seen in FIG. 18, the light assembly 150 includes a base element in the form of a heat exchanger 152 having a central recess 154 defined by a base surface 156 and a tapered circumferential wall 158. The heat exchanger 152 is made of any suitable heat conductive material, such as aluminum, and includes a plurality of heat exchanger fins 159 on a side thereof opposite the central recess 154. Further, if desired, and as in the embodiment of FIGS. 1-8, the base surface 156 and/or the tapered circumferential wall 158 may be covered or coated by a reflective material, which may be a white material or a material that exhibits specular reflective characteristics. A light source comprising one or more light emitting diodes (LEDs) 160 that is identical or similar to the light source 60 seen in FIG. 8 is mounted on a support member (not seen, but which may be identical or similar to the member 62 described above comprising a heat conductive substrate, such as a metal circuit board), and extends beyond the base surface 156.

The light source 160 is operated by control circuitry (not shown, but which may be identical or similar to the circuitry 64 described above) disposed in the central body 146 that receives AC power via the Edison-style plug. As in the previous embodiment, the control circuitry may be potted in the central body 146. Wires or conductors extend through one or more of the arms 148a-148d from the control circuitry to the light source 160. As in the previous embodiment, preferably, the light source 160 develops light appropriate for general illumination purposes.

A waveguide 170 is disposed in contact with the base surface 156 and the tapered circumferential wall 158 and is located by four location pins 172 that are disposed in corresponding blind bores 174 (the pins and the bores are identical or similar to the pins 72 and bores of FIGS. 6 and 8). In the illustrated embodiment, the waveguide 170 is similar or identical to the waveguide 70 or any other waveguide disclosed herein, it being understood that the waveguide may alternatively be modified in accordance with the design details of the present invention. As in the previous embodiment, the light source 160 extends into a central bore 176 of the waveguide 170 from a second side thereof. Also in the illustrated embodiment, a conical plug member 178 is secured to the waveguide 170 by any suitable means, such as a press fit, friction fit, and/or adhesive, and extends into the central bore 176 from the first side thereof, as in the embodiment of FIGS. 1-8. Also as noted above, the conical plug member 178 may be integral with the waveguide 170 rather than being separate therefrom. (For example, see FIG. 47, which illustrates that the plug member may be disposed completely within the central bore.) Further, the light source 160 may be integral with the waveguide 170, if desired.

The waveguide 170 may be secured in any suitable fashion and by any suitable means to the heat exchanger 152. In the illustrated embodiment, a ring member 190 similar or identical to the ring member 90 is secured to surfaces of the heat exchanger 152 and is retained thereon such that ribs 192 of the heat exchanger 152 are disposed in recesses 194 of the ring member 190 (FIG. 18). In addition the ring member 190 bears against that outer surface of the waveguide 170 so that the waveguide 170 is secured in place.

As in the previous embodiment, the lamp 140 can be used for general illumination, such as in a downlight or other luminaire, and achieves the advantages noted with respect to the previous embodiment.

Figure 18A:
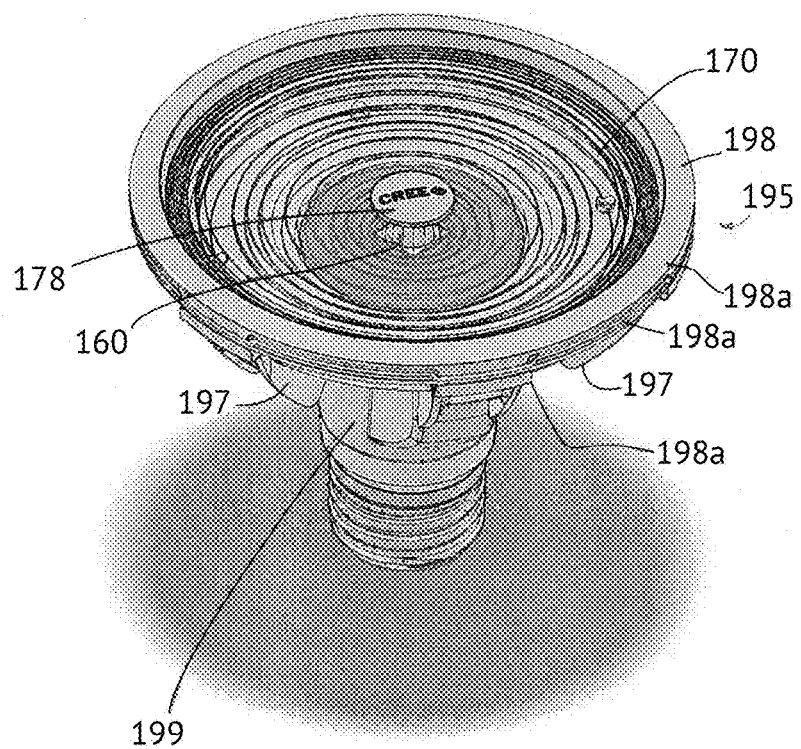
FIGS. 18A and 18B are isometric views of a further lamp.
Figure 18B:
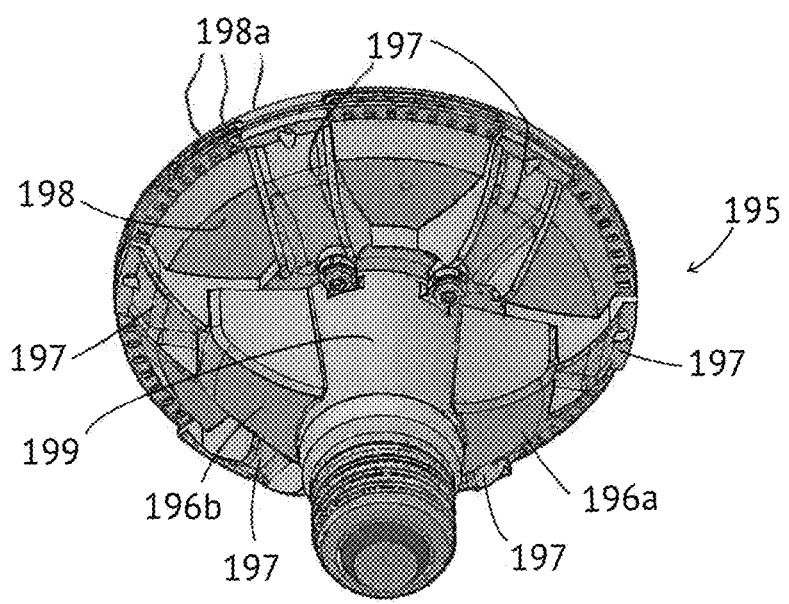

FIGS. 18A and 18B show yet another lamp 195 suitable for general illumination purposes. The lamp 195 may be of a size suitable for use as a PAR 30 lamp. The lamp 195 is substantially similar to the lamp 140 and includes two main arms 196a, 196b secured to a heat exchanger assembly including open fin structures 197 secured to a lower surface of a light assembly 198. The light assembly 198 includes the waveguide 170, or any other suitable waveguide, the light source 160, and the plug member 178 (or any other suitable light source and/or plug assembly). The light source 160 is mounted on a circuit board substrate that is intimately thermally coupled to the heat exchanger assembly by one or more rings 198a. Control circuitry (not shown) is disposed within a central body 199 and is connected to control the light source 160 by one or more wires that extend though one or both of the arms 196a, 196b. The open fin arrangement of the heat exchanger assembly and the intimate thermal coupling of the light source 160 to the heat exchanger assembly may allow improved thermal management such that the lamp 195 might be usable in enclosed installations.

FIGS. 18C-18G show a still further lamp 195a suitable for general illumination purposes. The lamp 195a may be of a size suitable for use as a PAR 30 lamp. The lamp 195a is substantially similar to the lamp 140 and includes three main arms 196c, 196d, 196e carried by a cup-shaped member 196f and secured to a heat exchanger assembly including open fin structures 197a secured to a lower surface of a light assembly 198a. The light assembly 198a includes the waveguide 170, or any other suitable waveguide, the light source 160, and the plug member 178 (or any other suitable light source and/or plug assembly). The light source 160 is mounted on a circuit board substrate that is intimately thermally coupled to the heat exchanger assembly by one or more rings 198b. Control circuitry (not shown) is disposed within a central body 199a and is connected to control the light source 160 by one or more wires that extend though one or more of the arms 196c-196e. The open fin arrangement of the heat exchanger assembly and the intimate thermal coupling of the light source 160 to the heat exchanger assembly may allow improved thermal management such that the lamp 195a might also be usable in enclosed installations.

Figure 19:
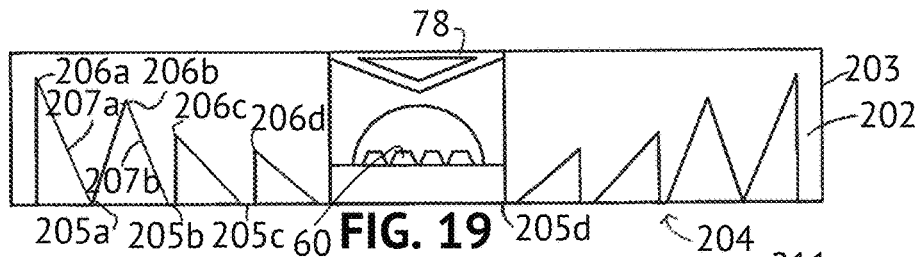
FIGS. 19, 19A and 20-25 are cross sectional views similar to FIG. 11 of further embodiments of waveguides according to the present invention.

Referring next to FIGS. 19-25, the waveguide can be modified to achieve other visual and/or optical characteristics. Specifically, the size, shape, other geometry, spacing, number, symmetry, and/or other physical characteristic(s) of the waveguide generally and/or the extraction features can be varied, as desired. Thus, FIG. 19 illustrates a waveguide 202 having an axial outer wall 203 and extraction features 204 comprising a plurality of ridges and troughs 205, 206. In this embodiment, the ridges 205 are unequally spaced, for example, the ridge 205a is spaced a first distance from an adjacent ridge 205b, the ridge 205b is spaced a second, different distance from an adjacent ridge 205c, and the ridge 205c is spaced a third distance from an adjacent ridge 205d. Further, the depths of the troughs 206 are different. Specifically, a depth of a trough 206a is different than the depths of troughs 206b, 206c and 206d. The shapes of one or more of the ridges 205a, 205b, 205c, and 205d can be different than other ridges. Also, a tapered surface 207a may be disposed at a first angle and a tapered surface 207b may be disposed at a second angle different than the first angle with respect to the first side of the waveguide. Alternatively, the pitch or spacings between troughs 205, the depths of the troughs 206, the angles of tapered surfaces 207, and the widths and shapes of the troughs 206 and/or the ridges 205 may be the same or different, as desired (compare FIG. 19 to subsequent FIGS.).

Figure 19A:
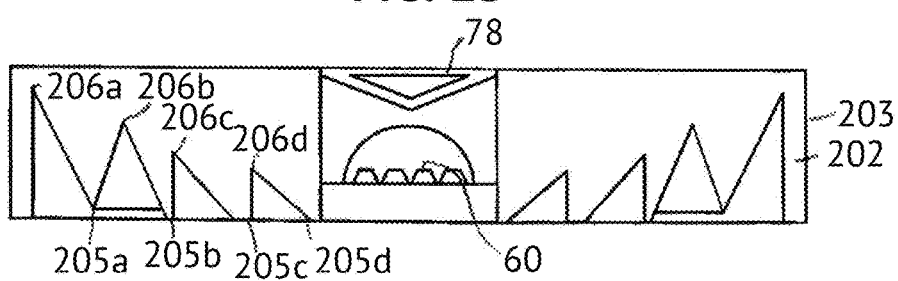

It should be also noted that less than all of the ridges 205 may be coterminous. Thus, for example, as seen in FIG. 19A, a ridge 205a may be disposed at a different elevation (i.e., distance from the first side of the waveguide) than remaining ridges 205b, 205c and/or 205d, which are coterminous.

Figure 20:
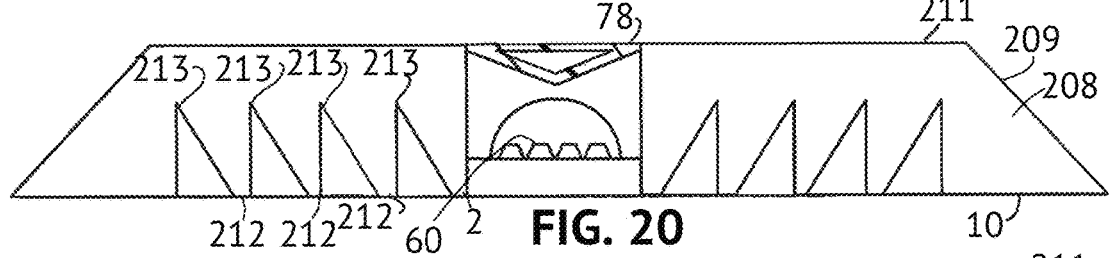
Figure 21:
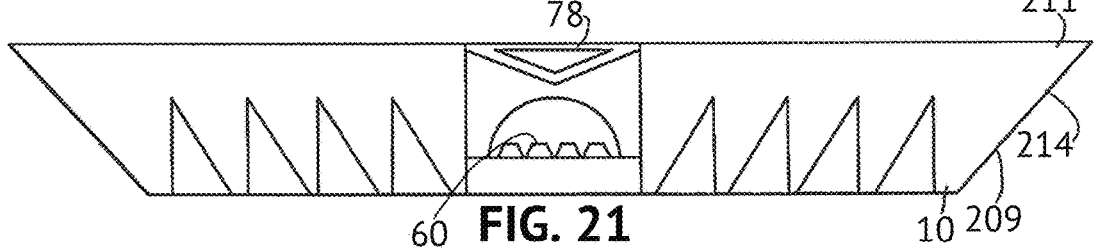

FIG. 20 illustrates a waveguide 208 having an inclined outer surface 209 wherein the surface 209 linearly tapers from a second side or surface 210 to a first side or surface 211. Extraction features comprising a plurality of ridges 212 and troughs 213 are equally sized and spaced in a symmetric pattern about a central axis of the waveguide 208. FIG. 21 illustrates a waveguide 214 substantially or completely identical to the waveguide 208, with the exception that the outer surface 209 linearly tapers from the surface 211 to the surface 210. As should be evident from an inspection of FIGS. 20 and 21, the outer surface may be disposed at an acute angle with respect to one of the first and second sides of the waveguide and may be disposed at an obtuse angle with respect to another of the first and second sides.

Figure 22:
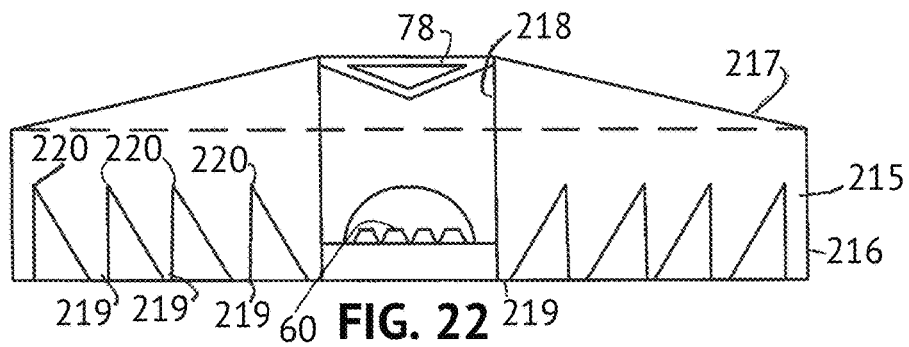
Figure 23:
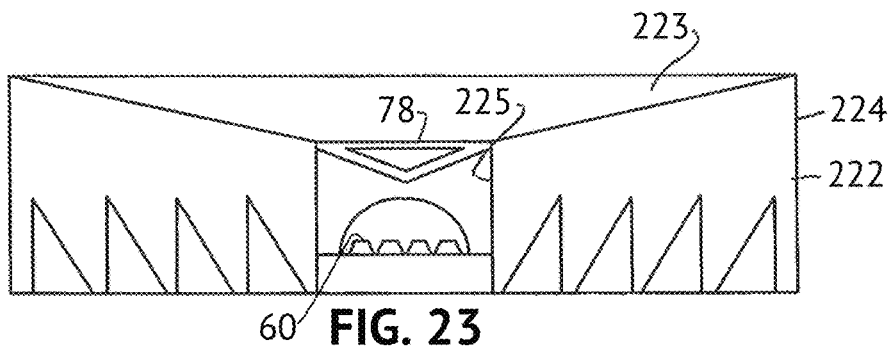

FIG. 22 illustrates a waveguide 215 having a frustoconically-shaped first side including a first surface 217 that is tapered from a central bore 218 to the outer surface 216. The waveguide 215 includes equally spaced and equally sized ridges 219 and troughs 220 and an outer surface 216 that extends in an axial direction. A waveguide 222 shown in FIG. 23 is substantially or completely identical to the waveguide 215, with the exception that the waveguide 223 is substantially or completely inverted frustoconically shaped in that the first surface 223 is inversely linearly tapered from an outer surface 224 to a central bore 225 as compared to the embodiment of FIG. 22. Thus, the first side of the waveguide may be convex (as in FIG. 22) or concave (as in FIG. 23) at least in part.

Figure 24:
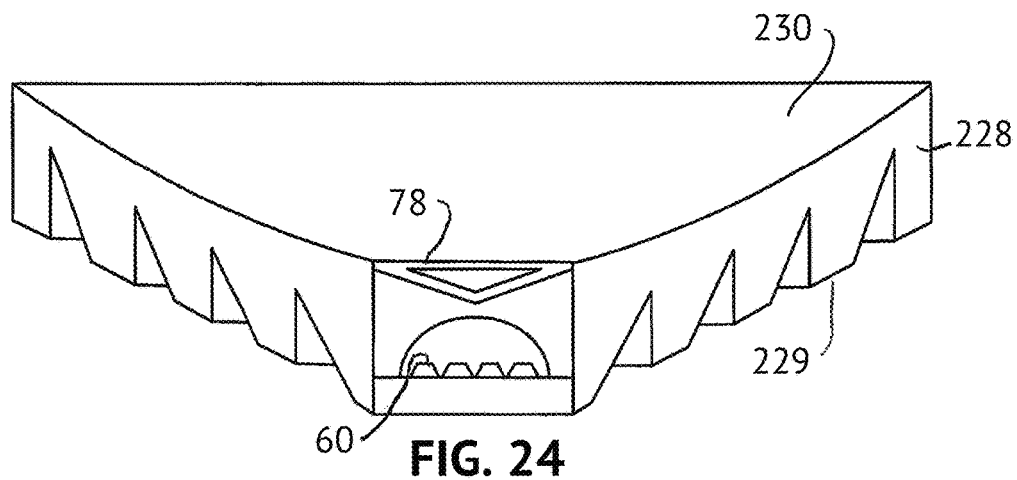

FIG. 24 illustrates a waveguide 228 having a concave first surface at least in part and which is identical or similar to FIG. 23, with the exception that first and second sides or surfaces 229, 230 are curved. In the illustrated embodiment, the sides or surfaces 229, 230 converge with radial distance from a centerline of the waveguide 228 resulting in a tapered waveguide, although these surfaces may alternatively diverge or be equally spaced over the radial dimension thereof.

Figure 25:
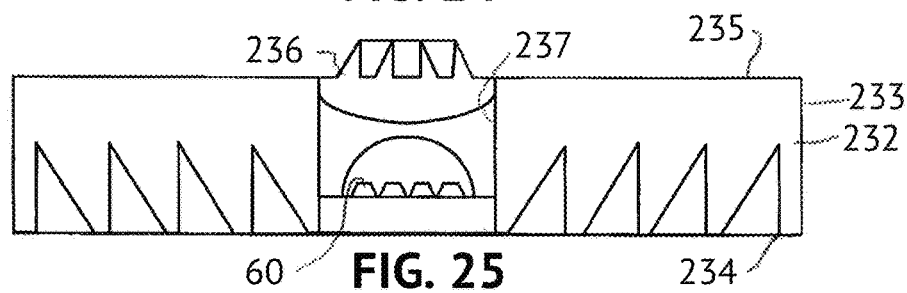

FIG. 25 illustrates a waveguide 232 having an axial outer surface 233, a first surface 234 and a second surface 235 that is generally parallel to the first surface 234. However, in the illustrated embodiment of FIG. 25, the plug member 78 is replaced by a total internal reflectance optical member 236 that is disposed within a central bore 237. The optical member 236 permits some light to pass from the light source 60 axially outwardly therethrough, and further reflects remaining light off of one or more surfaces of the optical member 236 into the waveguide in a transverse direction, as with the previous embodiments. While the embodiment of FIG. 25 may result in better efficiency, and may permit use of a smaller diameter waveguide, color mixing of light developed by the light source 60 may be adversely affected, and hence, the embodiment of FIG. 25 is preferably used with a single color light source 60 rather than one that attempts to duplicate a true-white appearance. Also, the embodiment of FIG. 25 may develop enough intensity to obtain a beam angle greater than or equal to 25° and may render the entire lamp simpler and cheaper. However, it may be that the intensity performance of the embodiment of FIG.

25 may be insufficient to permit development of an acceptable beam angle of less than 10°.

Figure 26:
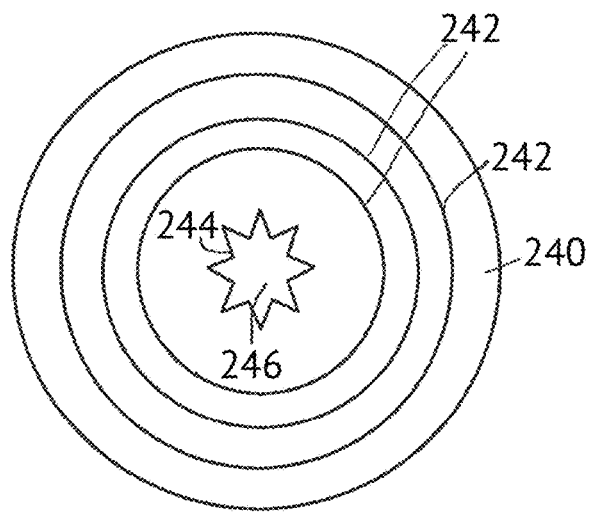
FIGS. 26-29 are elevational views of still further embodiments of waveguides according to the present invention.

Still further alternate configurations of the waveguide are illustrated in FIGS. 26-29. FIG. 26 shows a waveguide 240 having an overall circular configuration having a plurality of extraction elements 242 and a star-shaped central bore 244 that may be substituted for the circular cylindrical bore of the waveguide 70. A complementarily-shaped plug member 246, which may also have a star shape, may be inserted into and retained within the star-shaped central bore 244. The plug number 246 may have a star-shaped tapered (i.e., conical) member that reflects light generated by a light source 60, or may have a circular conical reflective surface, or any other shaped reflective surface, as desired.

Figure 27:
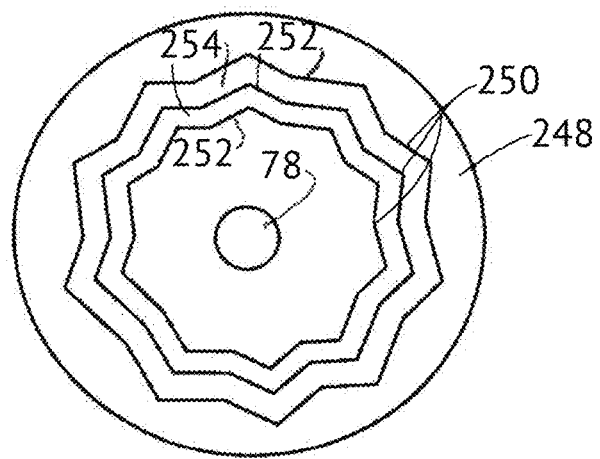

FIG. 27 illustrates an embodiment wherein a generally circular waveguide 248 includes a plurality of waveguide features 250 that surround a central axial bore 252 of circular cylindrical shape. The extraction features 250 may comprise a series of ridges 252 and troughs 254 wherein the ridges and troughs 252, 254 are approximately or substantially flower-shaped or comprise some other shape. The waveguide 248 may be used with the plug member 78, or another plug member as desired.

Figure 28:
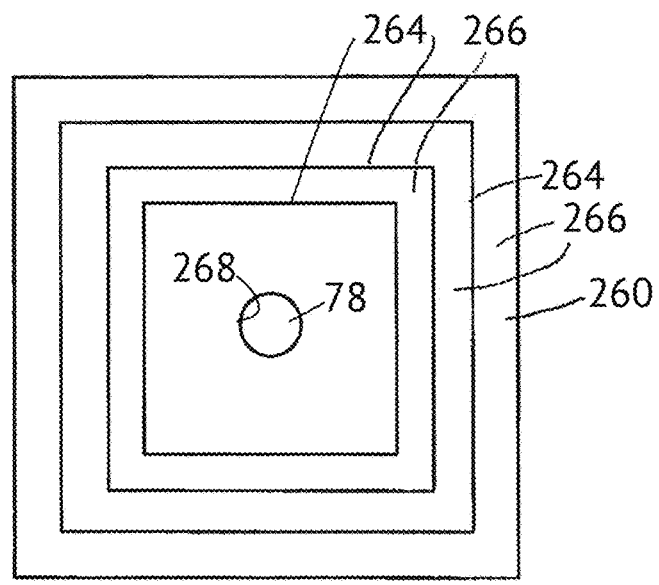
Figure 29:
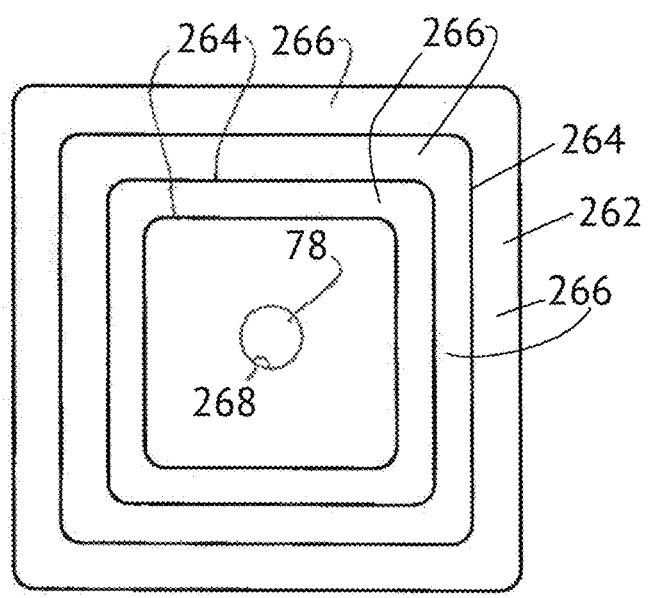

FIGS. 28 and 29 illustrate waveguides 260, 262, respectively, which are approximately or substantially rectangular or square. In the case of the waveguide 260 the extraction features 264 comprise ridges separated by intervening troughs 266 and the ridges and troughs are rectangular or square. Also in the illustrated embodiment of FIG. 28, corners between the sections of the ridges and troughs are sharp and the ridges and troughs surround a circular cylindrical central bore 268. The plug member 78 may be used with the embodiment of FIG. 28, if desired.

FIG. 29 illustrates an embodiment identical to FIG. 28, with the exception that the corners between adjacent sections of the ridges and troughs 264, 266 are rounded. Again, a circular cylindrical central bore may be provided and the plug number 78 may be used with the embodiment of FIG. 29.

Figure 30:
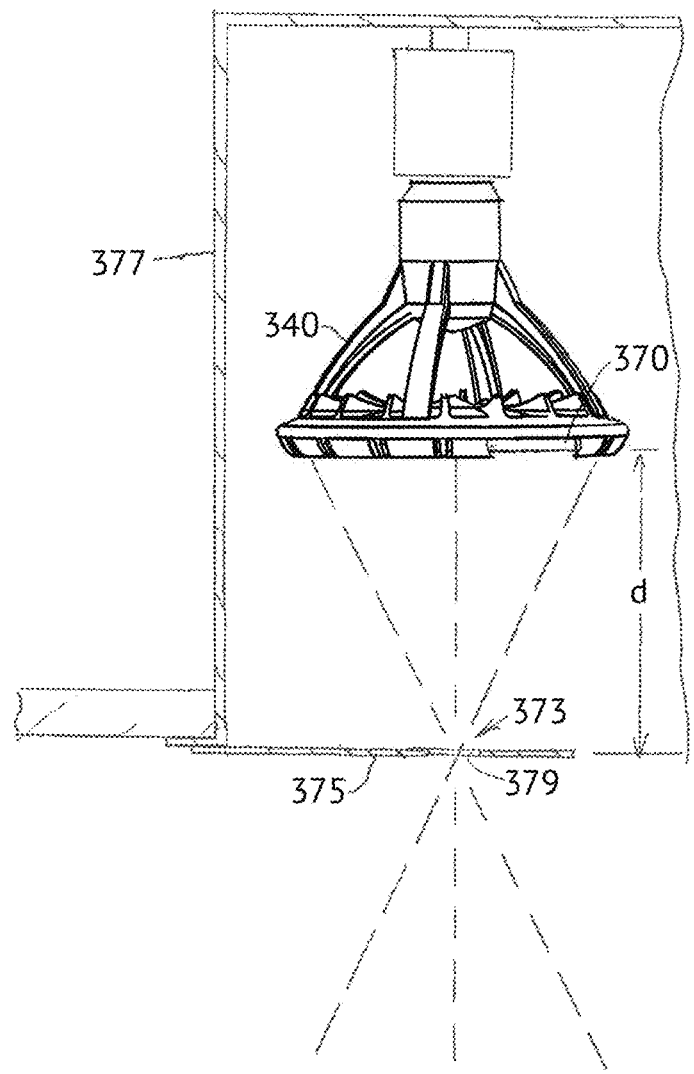
FIG. 30 is a side elevational view, partly in section, of yet another embodiment of a luminaire including a waveguide according to the present invention.
Figure 31:
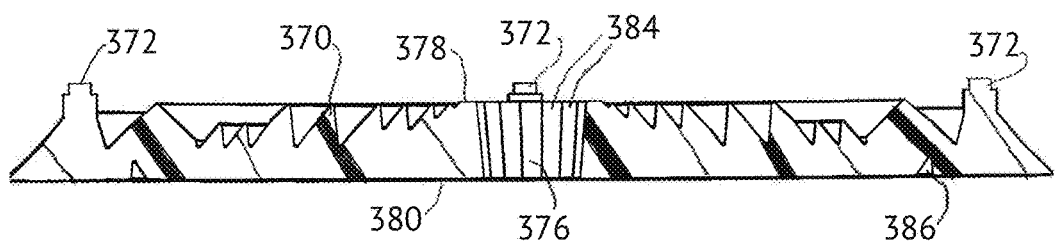
FIG. 31 is a view identical to FIG. 11 of a further waveguide according to the present invention.

It should be noted that, in an alternative embodiment, the waveguide can be designed to provide a beam angle that has a minimum transverse spread at a particular distance from the waveguide and larger transverse spreads at lesser and greater distances from the waveguide. More particularly, referring to FIG. 30, a lamp 340 identical to the lamp 40 and having a waveguide 370, which may be similar or identical to any of the waveguides described hereinabove in terms of material composition and overall geometry, may be designed to include extraction features that are preferably, although not necessarily, symmetric about a central axis of the waveguide. The extraction features may be different than the extraction features described above such that light rays emitted at radially outward portions of the waveguide 370 are directed axially inwardly and downwardly (as seen in FIG. 30), with the magnitude of the angle of inward direction being roughly or substantially proportional to the radial distance of emission of the light ray from the center of the waveguide 370. The resulting beam shape is such that a convergence region 373 is formed at a distance d from the outer surface of the waveguide. Light rays diverge at distances greater than d from the waveguide 370. This beam shape permits a trim ring 375 of an associated luminaire 377 to have a relatively small diameter aperture 379 but still have a significantly large illumination area beyond the distance d. The result is a reduction in visible glare because of the shielding effect provided by the trim ring 375 and a pleasing aesthetic appearance. In general, the size of the aperture 379 is preferably equal to or smaller than the size of the waveguide of the lamp 340, and, more preferably, the cross sectional size of the aperture 379 relative to the cross sectional size of the waveguide is between about 1:2 to about 1:4. The design of a waveguide that effectuates the foregoing is within the abilities of one of ordinary skill in the art given the disclosure herein.

FIGS. 31-35 illustrate yet another embodiment of a waveguide 370 in accordance with the present invention. The waveguide 370 may be used in place of any of the waveguides disclosed herein, such as the waveguide 170. The waveguide 370 includes four location pins 372 that are identical to the pins 72. In the illustrated embodiment, the light source 60 extends into a central bore 376 of the waveguide 370 from a second side 378 thereof. Also in the illustrated embodiment, a conical plug member (such as the plug member 78) is secured to the waveguide 370 by any suitable means, such as adhesive, and extends into the central bore 376 from a first side 380 thereof, as in the embodiment of FIGS. 1-8. Also as noted above, the conical plug member 78 may be integral with the waveguide 370 rather than being separate therefrom. Further, the light source 60 may be integral with the waveguide 370, if desired.

Figure 32:
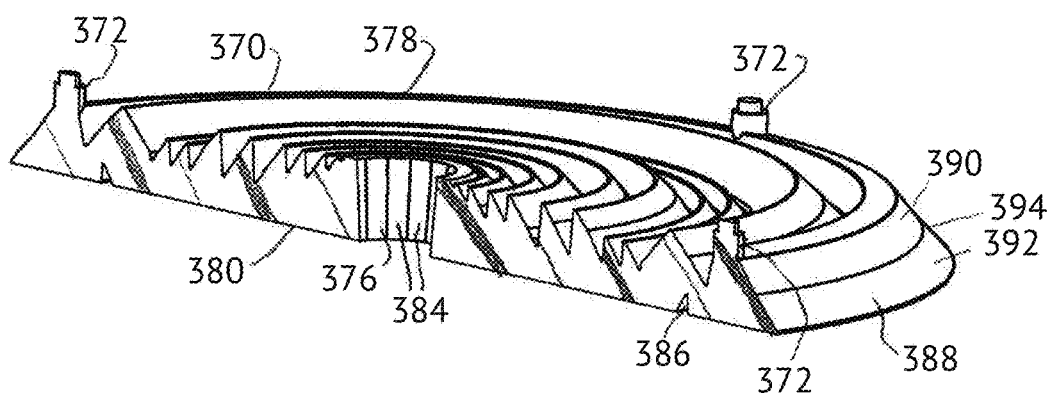
FIG. 32 is a sectional and first side isometric view of the waveguide of FIG. 31.
Figure 33:
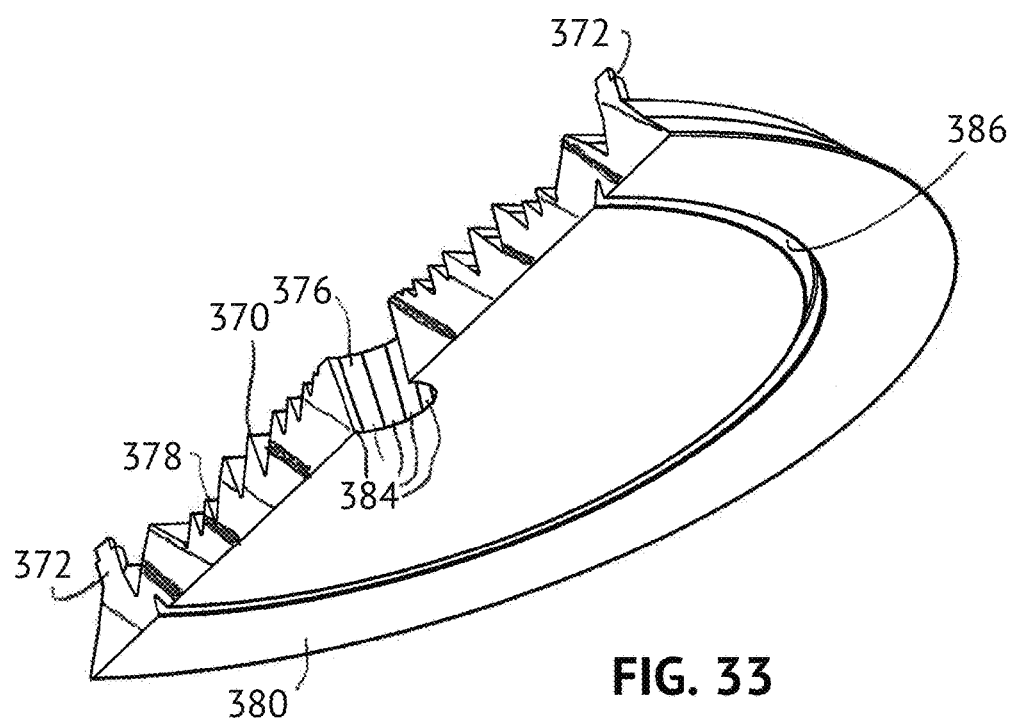
FIG. 33 is a sectional and second side isometric view of the waveguide of FIG. 31.
Figure 34:
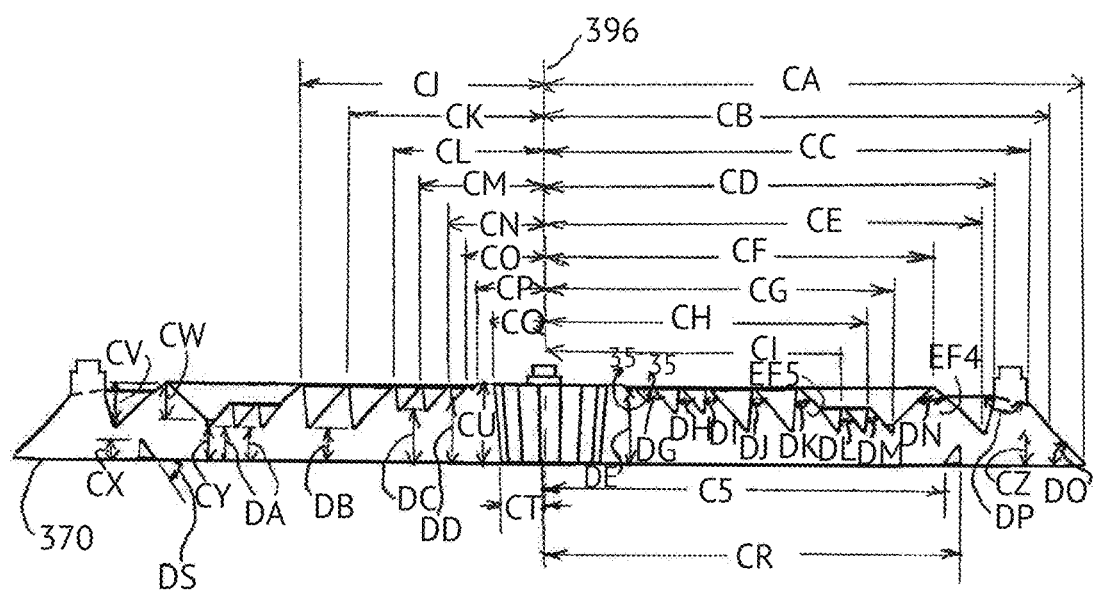
FIG. 34 is a sectional view identical to FIG. 31 identifying sample dimensions of the waveguide thereof.

Also in the illustrated embodiment, the central bore 376 is not cylindrical, but instead comprises a tapered bore defined by twelve equally-sized facets 384. In the illustrated embodiment in which the waveguide 370 is made of an acrylic, the taper may be at an angle between about zero degrees and about 8 degrees. In other embodiments in which the waveguide is made of another material, such as polycarbonate or glass, the taper angle maximum may be other than 8 degrees without significantly adversely affecting efficiency. An extraction feature in the form of a groove 386 extends into the waveguide 370 from the first side 380. An outer tapered portion 388 includes first and second sections 390, 392 that meet at a junction 394 (FIG. 32). As in the previous embodiments, the waveguide 370 is made of optical grade acrylic and/or silicone and, in one example, has the dimensions noted in the following table and as seen in FIG. 34. It should be noted that the dimensions in the following table as exemplary only and not limiting (the dimension CB is the distance of the junction 394 from the center line 396 (FIG. 34) of the waveguide 370):

TABLE 2

| REFERENCE (FIG. 34) | NOMINAL DIMENSION (Millimeters - unless otherwise specified) |
| --- | --- |
| CA | 47.431 |
| CB | 44.789 |
| CC | 42.500 |
| CD | 39.500 |
| CE | 38.763 |
| CF | 34.105 |
| CG | 30.547 |
| CH | 28.475 |
| CI | 26.155 |
| CJ | 22.171 |
| CK | 18.203 |
| CL | 14.042 |
| CM | 11.658 |
| CN | 9.032 |
| CO | 7.348 |
| CP | 6.5000 |
| CQ | 5.000 |
| CR | 36.648 |
| CS | 34.922 |
| CT | 4.388 |

TABLE 2-continued

| REFERENCE (FIG. 34) | NOMINAL DIMENSION (Millimeters - unless otherwise specified) |
|---|---|
| CU | 7.000 |
| CV | 4.018 |
| CW | 3.365 |
| CX | 1.707 |
| CY | 2.926 |
| CZ | 3.000 |
| DA | 2.926 |
| DB | 2.926 |
| DC | 4.582 |
| DD | 5.525 |
| DE | 6.500 |
| DF | 47.4° |
| DG | 45° |
| DH | 45° |
| DI | 47.3° |
| DJ | 45.7° |
| DK | 51.3° |
| DL | 43.9° |
| DM | 45.6° |
| DN | 95° |
| DO | 45° |
| DP | 55.8° |
| DQ | 134.1° |
| DR | 49° |
| DS | 55° |

Figure 35:
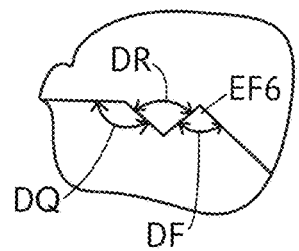
FIG. 35 is an enlarged fragmentary view of a portion of the waveguide of FIG. 34 seen generally at the lines 35-35 of FIG. 34.
Figure 36:
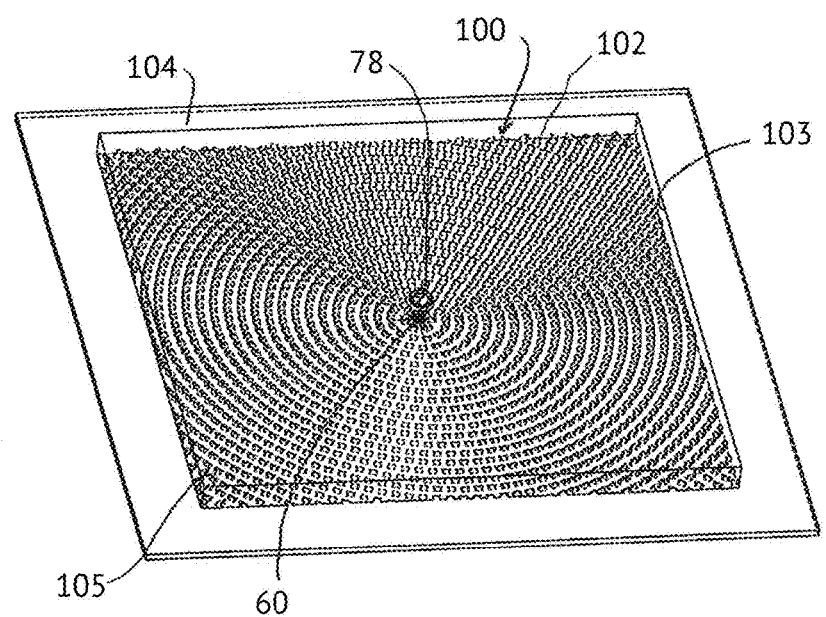
FIGS. 36-38 are isometric, plan and sectional views, respectively, of a further embodiment of an optical waveguide.
Figure 37:
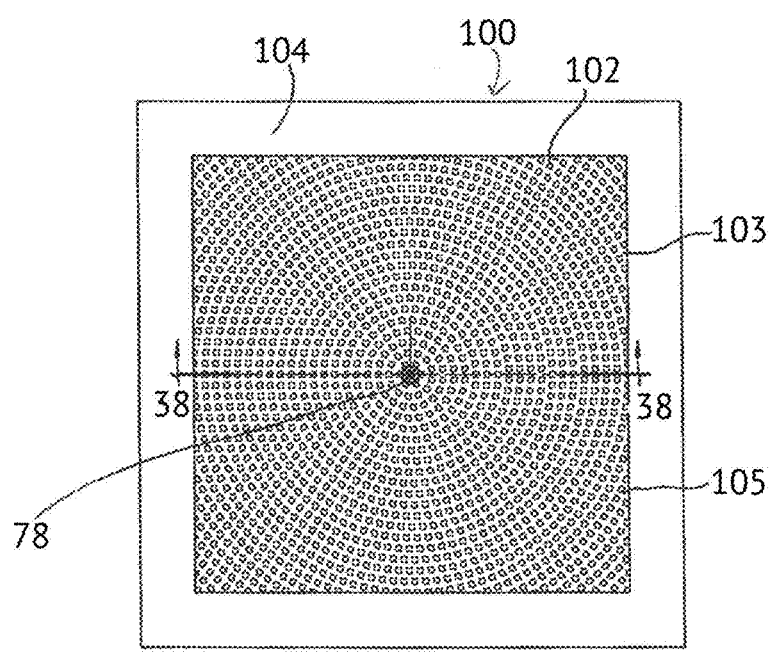
Figure 38:
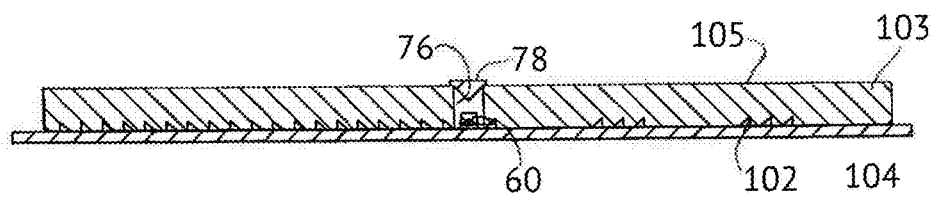

From the foregoing dimensions one can calculate extraction feature aspect ratios AR4, AR5, and AR6 at least approximately using the same equation (1) above for extraction features EF4, EF5, and EF6 in FIGS. 34 and 35 as follows:

$$AR4=(CE-CG)/(CU-CY)=(38.763-30.547)/(7.000-2.926)=8.216/4.074=2.02 \quad (5)$$

$$AR5=(CI-CJ)/(CU-DB)=(26.155-22.171)/(7.000-2.926)=3.984/4.074=0.98 \quad (6)$$

$$AR6=(CN-CP)/(CU-DE)=(9.032-6.500)/(7.000-6.500)=2.532/0.500=5.064 \quad (7)$$

As seen in the FIGS. and as calculated above in the equations (2)-(7), the extraction features EF1-EF6 range between aspect ratios of about 0.98 to about 5.064. Preferably, although not necessarily, the present invention contemplates the use of extraction features having aspect ratios that vary between about 0.25 and about 20, and more preferably between about 0.5 and about 10, and most preferably between about 0.75 and about 7.5.

An inspection of tables 1 and 2 above also indicates that, overall, the waveguides include extraction features that are deeper with distance from the center line of the waveguide. Thus, for example, as seen in FIG. 11A, the extraction feature dimension A1 is less than the dimensions AK-AF, and the latter dimensions are less than the dimensions AE and AB. The same holds true for the extraction features of FIG. 34. In the illustrated embodiments, the depth of the extraction features varies between a minimum in FIG. 34 of 0.5 mm to a maximum in FIG. 11A of 5 mm. Extraction feature depths are preferably expressed as a percentage of overall thickness because, in general, the maximum depth of the extraction features is only limited by the structural integrity of the remaining material. Each extraction feature preferably has a depth between about 5% to about 75% of the overall thickness of the waveguide 70 (the overall thickness is the top to bottom dimension as seen in FIGS. 11A and 34 at the wall defining the central bore) and, more preferably, a depth between about 7% and 67% of the overall thickness of the waveguide. Greater extraction feature depths might be achievable using stronger material(s) for the waveguide.

Still further, the spacings (i.e., pitch) between adjacent extraction features overall increases with distance from the center line (although not necessarily in every circumstance between adjacent extraction features having small or approximately equal aspect ratios). For example, the distances between ridges of the extraction features of FIGS. 11A and 34 are as follows:

TABLE 3

| REFERENCE (FIG. 11A) | NOMINAL DIMENSION (Millimeters) |
|---|---|
| L-M | 2.000 |
| K-L | 4.700 |
| J-K | 4.300 |
| I-J | 4.000 |
| H-I | 4.500 |
| F-H | 4.200 |
| D-F | 5.400 |
| B-D | 8.500 |

TABLE 4

| REFERENCE (FIG. 34) | NOMINAL DIMENSION (Millimeters) |
|---|---|
| CO-CP | 0.848 |
| CN-CO | 1.684 |
| CM-CN | 2.626 |
| CL-CM | 2.384 |
| CK-CL | 4.161 |
| CJ-CK | 3.968 |
| CI-CJ | 3.984 |
| CH-CI | 2.320 |
| CF-CH | 5.630 |
| CD-CF | 5.395 |

The spacing between adjacent extraction features may be as small as about 0.7 mm (or less) near the center line of the waveguide and may be 9 mm (or more) at the outer edges of the waveguide.

Figure 9:
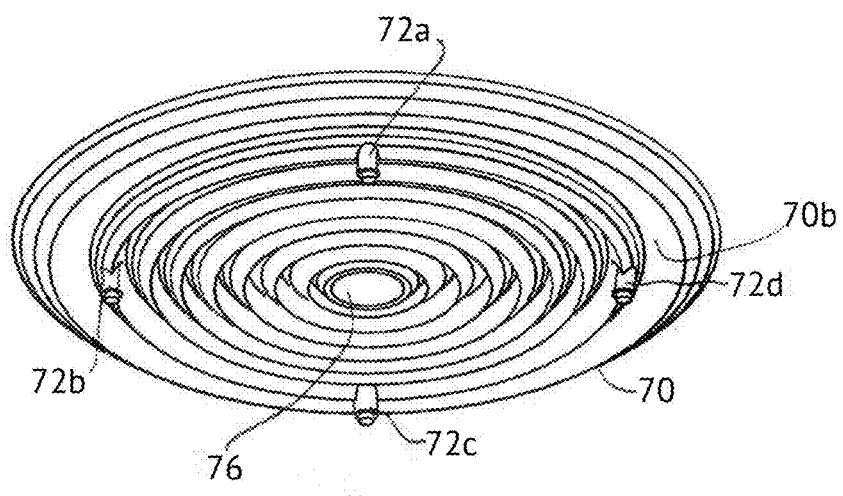
FIG. 9 is an interior isometric view of the waveguide of FIG. 1.
Figure 10:
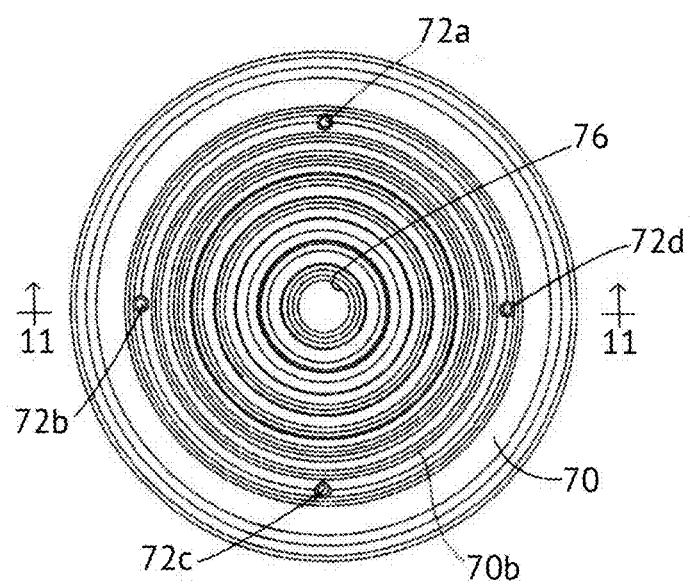
FIG. 10 is an interior elevational view of the waveguide of FIG. 1.

As in the embodiment of the waveguide shown in FIGS. 9-11, the waveguide 370 of FIG. 34 tapers from the center thereof to the edges in the sense that less material is disposed at the edges of the waveguide 70 than at the center. This fact, in combination with the particular design of the extraction features and the efficient coupling of light into the waveguide result in the improved color mixing, minimized thickness, and excellent control advantages noted above.

Figure 40:
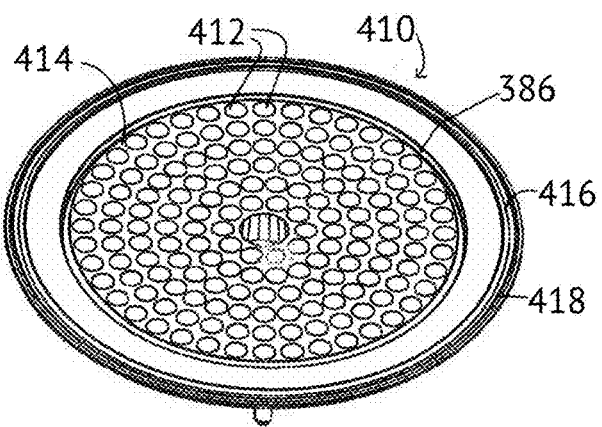
FIGS. 40-42 are isometric, plan, and fragmentary sectional views, respectively, of yet another optical waveguide.
Figure 41:
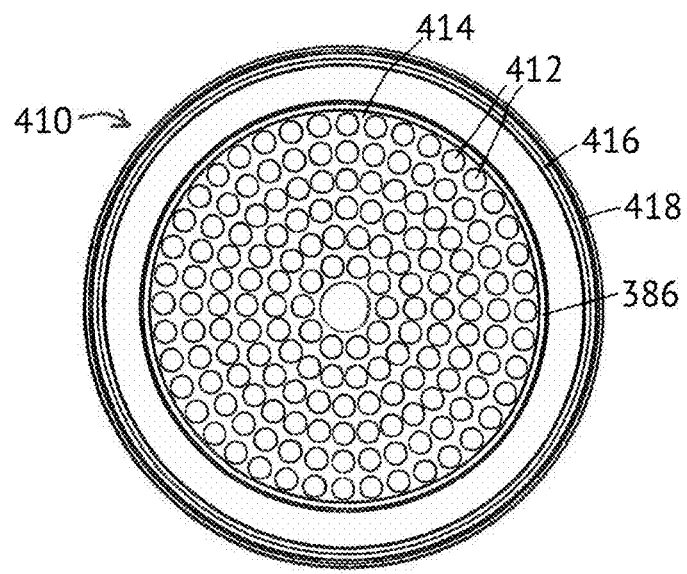
Figure 42:
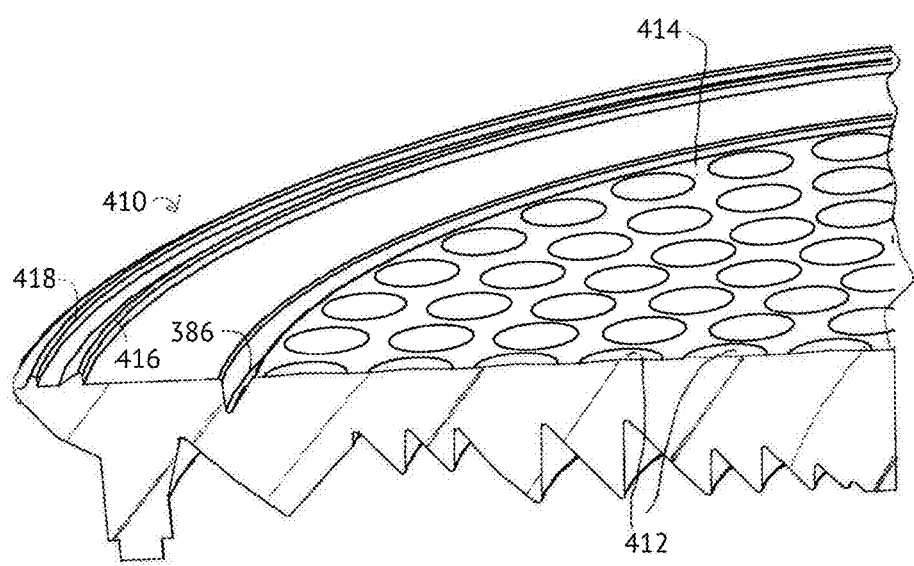

Referring next to FIGS. 40-42, a waveguide 410 is identical to the waveguide 370 with the following exceptions. Multiple lenslets 412 are arrayed across a surface 414. The lenslets 412 are identical in size and shape and are substantially equally spaced across the surface 414 inside the extraction feature 386, although this not need to be the case. Specifically, the lenslets could be unequally sized and/or spaced and/or shaped. In the illustrated embodiment, the lenslets 412 are circular in shape (although other shapes could be used, such as a polygonal shape) and convex (as seen in FIG. 41). Some or all of the lenslets 412 may be concave, if desired. In the preferred embodiment, each lenslet has a preferred range of aspect ratio of diameter to height of at least about 5:1 to about 60:1. In the illustrated embodiment, each lenslet is 0.1 mm in height and 4 mm in diameter and has a smooth exterior surface. In addition, two additional extraction features 416, 418 are provided radially outside the extraction feature 386. In the illustrated embodiment, the extraction features 416, 418 extend fully and continuously about the waveguide 410 and comprise upstanding annular ribs having smooth outer surfaces. The lenslets 412 and the extraction features 416, 418 contribute to desirable mixing of light and control over the emitted light while not contributing substantially to waveguide thickness.

Figure 43:
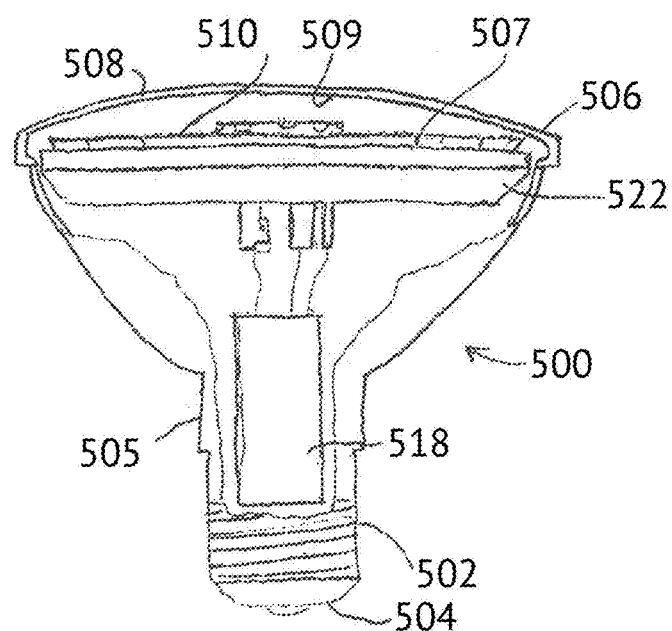
FIG. 43 is a side elevational view with portions broken away of a lamp incorporating a waveguide.
Figure 44A:
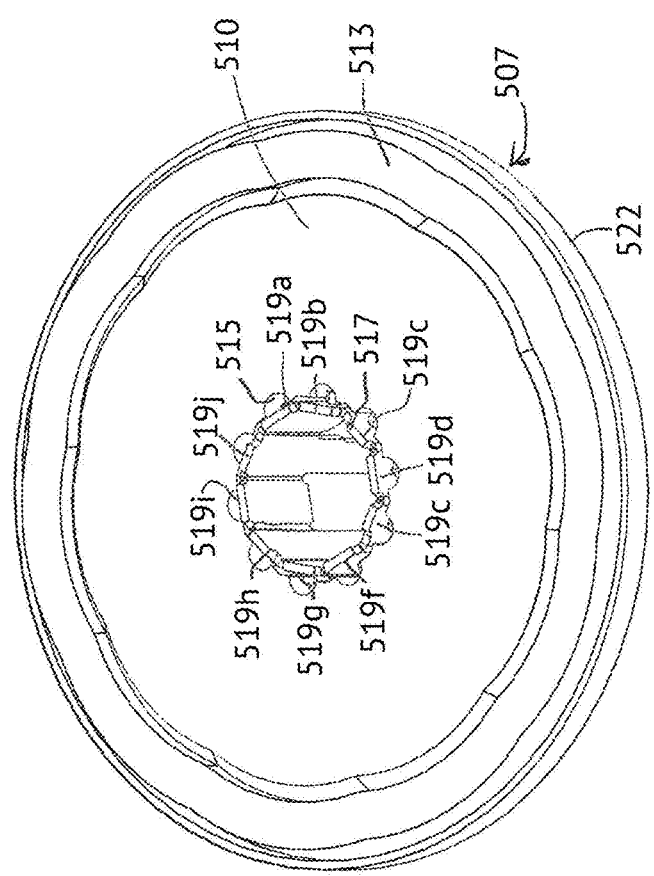
FIGS. 44A-44D are a top isometric view, a bottom isometric view, a side elevational view, and a plan view, respectively, of the light assembly of FIG. 43.
Figure 44B:
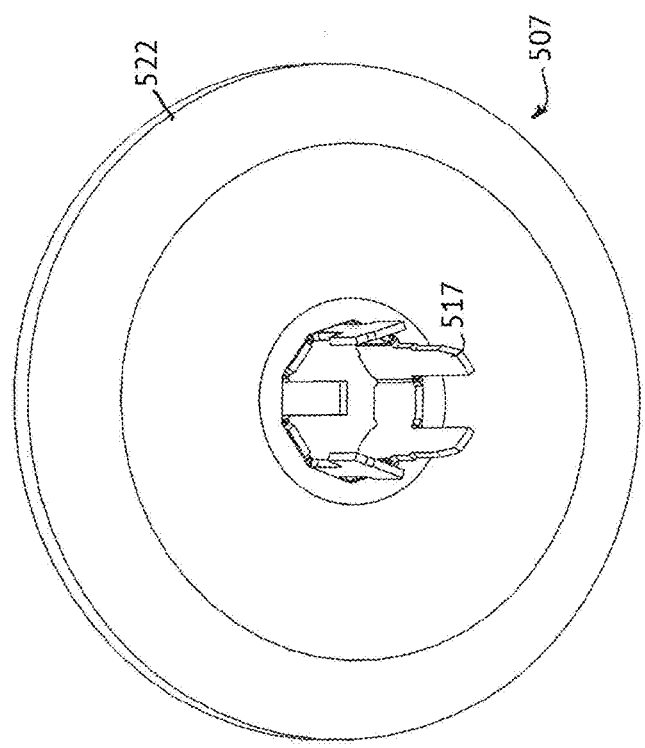
Figure 44C:
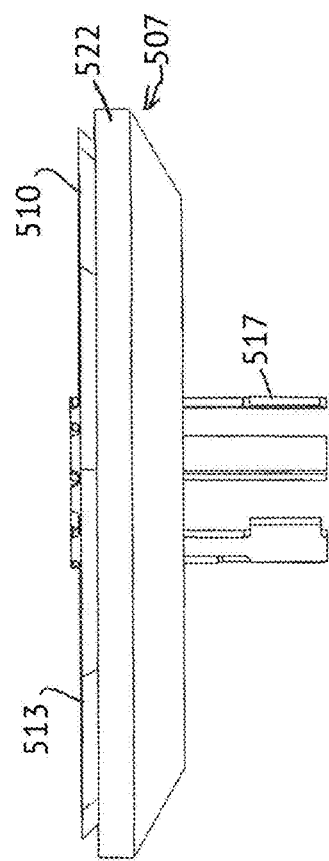
Figure 44D:
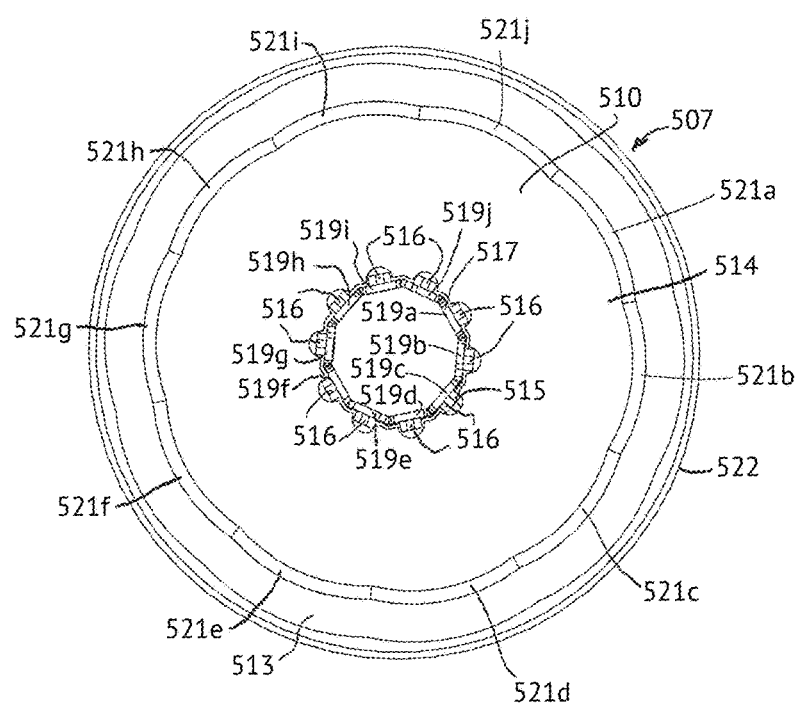
Figure 45C:
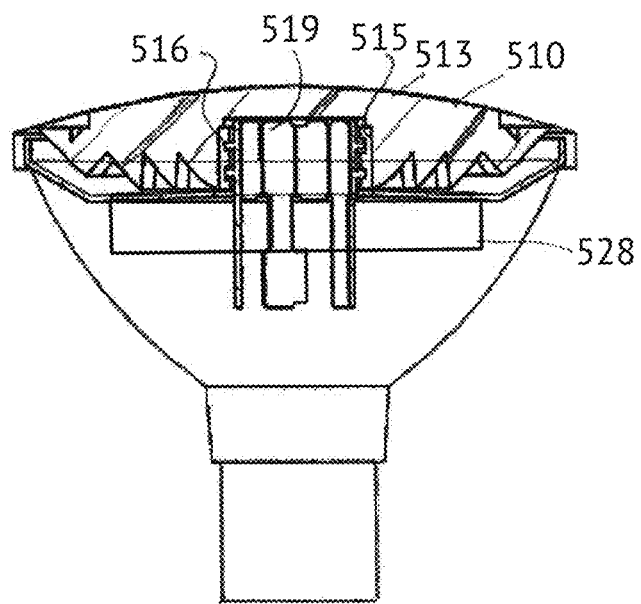
FIG. 45C is a view similar to FIG. 43 illustrating an alternative lamp incorporating a waveguide.

A further lamp 500 that is shaped externally similar to a standard incandescent PAR 30 spotlight is illustrated in FIGS. 43-45. As seen in FIG. 43, the lamp 500 includes a base 502 including an Edison-style plug 504, a central body 505, and a cap member 506 made of light transmissive material, such as optical grade acrylic, polycarbonate, or silicone. A light assembly 507 is mounted in any suitable fashion within the central body 505 and is covered by the cap member 506. The cap member 506 is secured to the central body 505 in any suitable manner, such as adhesive, ultrasonic welding, or the like. The cap member 506 includes a smooth, curved outer surface 508. The outer surface 508 and/or an inner surface 509 of the cap member 506 are preferably, although not necessarily, coated with a material that diffuses light. Referring also to FIGS. 44A-44D, 45A, and 45B, the light assembly 507 includes a waveguide body 510 having extraction features 511 formed in one or both of inner and outer surfaces 512, 513, respectively, to obtain a waveguide 514, as in the previous embodiments. The inner surface 510 further includes an interior coupling cavity 515. Multiple light sources, such as multiple LEDs 516, are arranged on a cylindrical carrier 517 and are inserted into the coupling cavity 515. The LEDs receive power via the Edison-style plug 504 and a driver circuit mounted on one or more circuit boards 518 disposed in the central body 505 such that the LEDs 516 develop light that is directed radially outwardly into the waveguide body 510. Because the light developed by the LEDs is directed outwardly in the first instance, there is no need for a light diverter. Further, as seen in FIG. 45C, the waveguide body 510 may have a curved outer surface 513, if desired, to further mimic a conventional incandescent spotlight. The curved outer surface may be coated with a light-diffusing material, although this need not be the case. As also seen in FIG. 45C, the carrier 519 and the LEDs 516 may be disposed in a blind bore comprising the coupling cavity 515 in the waveguide body 510, as opposed to the through bore comprising the coupling cavity 515 of FIGS. 43-45B.

Referring again to FIGS. 44A-44D, 45A, and 45B, the lamp 500 advantageously utilizes the waveguide 514 to obtain a beam spread of a desired magnitude, for example, 10 degrees to mimic a narrow-beam incandescent spotlight, if desired. Specifically, the cylindrical carrier 517 includes multiple (in the illustrated embodiment ten) facets 519a-519j (FIGS. 44A and 44D) wherein two or another number of LEDs are mounted in each of the facets 519. The extraction features 511 in the inner surface 512 of the waveguide body 510 arrayed in an overall flower-shaped pattern including multiple sections 511a-511j each associated with one of the facets 519a-519j, respectively. Each section 511a-511j is disposed outside of the associated facet 519a-519j and includes nested curved extraction subsections (see, for example, subsections 551f-1, 511fa-2, . . . 511f-N in FIG. 45B). The extraction subsections meet adjacent extraction subsections at inflection regions (see, e.g., inflection regions 520a, 520b, . . . , 520N in FIG. 45B). Also in the illustrated embodiment, a light extraction feature 521 comprising groove sections 521a-521j (FIG. 44D) are disposed in the outer surface 513. In the illustrated embodiment, each extraction subsection of each section 511 is coaxial with the LEDs carried by the associated facet 519. Light is extracted efficiently out of the waveguide body 510 by the curved subsections and the groove sections.

The waveguide body 510 and the carrier 517 with LEDs 516 are disposed within a reflecting backplane member 522 having a tapered surface 524 and a planar base surface 526. One or both of the interior surfaces are coated/covered with a reflective material, such as a specular reflective material or film or a white material or film. Light that escapes the inner surface 511 of the waveguide body 510 is thus reflected back into the waveguide body so that light is efficiently extracted out the outer surface 513. By suitably designing the extraction features that results in a tapered waveguide body 510 similar to the previous embodiments, one can obtain color mixing and light emission control as in the previous embodiments without utilizing a light diverter, such as the plug member 78.

It should be noted that any of the embodiments disclosed herein may utilize a reflective backplane member like the member 522, if desired. Also, the backplane 522 may have other than a planar base surface 526, such as a curved surface.

As seen in FIG. 45C, a heat exchanger 528 (diagrammatically shown) may be provided in thermal contact with the LEDs and may be disposed immediately below the backplane 522. The heat exchanger 528 can be arranged to eliminate thermal crosstalk between the LEDs and the driver circuit.

If desired, the waveguide body 510 can be modified to obtain a different beam spread, such as greater than 10 degrees. For example, the lamp may achieve a beam spread of 15 degrees, 25 degrees, or even up to 60 degrees, or any value in between.

While a uniform distribution of light may be desired in certain embodiments, other distributions of light may be contemplated and obtained using different arrays of extraction features.

Other embodiments of the disclosure including all of the possible different and various combinations of the individual features of each of the foregoing embodiments and examples are specifically included herein. Thus, for example, a waveguide of one of the disclosed shapes may include extraction features of the same or a different shape, and the extraction features may be symmetric or asymmetric, the extraction features may have differing or the same geometry, spacing, size, etc. without departing from the scope of the invention.

INDUSTRIAL APPLICABILITY

In certain embodiments, the waveguides disclosed herein generally taper from a central axis to an outside edge thereof so that substantially all light is extracted during a single pass of each light ray from the LED(s) to the outer edge of the waveguide. This extraction strategy maximizes the incidence of light rays impinging on an outer side of each extraction feature and being reflected out a surface (or surfaces) of the waveguide in a controlled manner, as opposed to striking other surfaces at an angle greater than the critical angle and escaping as uncontrolled light. The outer sides of the extraction features are accurately formed so that control is maintained over the direction of extracted light, thereby allowing a high degree of collimation. Further, where the lamp is to be used for general illumination such that the plug 44 is above the waveguide, the heat exchanger 52 is effective to maintain LED junction temperature below specified limits so that LED life is maximized without the need for heat pipes and/or flex wires. Still further, the waveguide is very low profile, leaving more room for heat exchanger structures, driver components, and the like. Also, glare is reduced as compared with other lamps using LED light sources because the LED(s) are shielded from direct view by element(s), such as the conical plug member 78, and light is directed outwardly in the waveguide while being extracted from the waveguide by the extraction features such that the resulting emitted light is substantially mixed, highly collimated, and substantially uniformly distributed throughout the beam angle. The result is a light distribution that is pleasing and particularly useful for general illumination and other purposes using a light source, such as one or more LEDs.

Numerous modifications to the present disclosure will be apparent to those skilled in the art in view of the foregoing description. Accordingly, this description is to be construed as illustrative only and is presented for the purposes of enabling those skilled in the art to make and use the present disclosure and to teach the best mode of carrying out the same.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

We claim:

1. A lamp, comprising:
a base having an electrical connector;
a central body disposed on the base;
a driver circuit disposed in the central body and coupled to the electrical connector; and
a light assembly joined to the central body, wherein the light assembly includes a waveguide comprising a first surface and a second surface that terminate in an outer surface to define a waveguide body, the waveguide body surrounding an interior coupling cavity disposed such that the waveguide body extends radially from the interior coupling cavity, at least one LED disposed in the interior coupling cavity and connected to the driver circuit such that the at least one LED emits light into the waveguide body when activated by the driver circuit, the light propagating radially outwardly through the waveguide body between the first surface and the second surface to the outer surface, and a plurality of extraction features disposed in and spaced across the second surface of the waveguide body, the plurality of extraction features reflecting the light to the first surface, the light being emitted from the waveguide through the first surface; wherein light emitted at radially outward portions of the first surface are directed axially inwardly at an inward angle, the inward angle being substantially proportional to a radial distance of emission of the light from the center of the waveguide.

2. The lamp of claim 1, wherein the plurality of extraction features comprise a plurality of concentric grooves in the second surface.

3. The lamp of claim 1, wherein the plurality of extraction features comprise a plurality of spaced grooves in the second surface.

4. The lamp of claim 2, wherein the plurality of extraction features are continuous and surround the interior coupling cavity.

5. The lamp of claim 2, wherein the plurality of extraction features direct light over substantially the entire first surface.

6. The lamp of claim 2, wherein the plurality of extraction features are discontinuous.

7. The lamp of claim 1, wherein the at least one LED comprises a plurality of LEDs disposed on a carrier.

8. The lamp of claim 7, wherein the plurality of LEDs direct light transversely through the waveguide body.

9. The lamp of claim 1, wherein the electrical connector comprises an Edison style plug.

10. The lamp of claim 1, wherein the interior coupling cavity comprises a central bore.

11. The lamp of claim 10, further including a conical plug member disposed in the central bore.

12. The lamp of claim 11, wherein the conical plug member includes a conical reflective surface.

13. The lamp of claim 12, wherein the at least one LED directs light onto the conical reflective surface where the light is diverted transversely into the waveguide body.

14. The lamp of claim 1, wherein the light assembly further includes a heat exchanger.

15. The lamp of claim 14, wherein the heat exchanger eliminates thermal crosstalk between the at least one LED and the driver circuit.

16. The lamp of claim 1, further including a plurality of arms carried by the central body and joined to the light assembly.

17. The lamp of claim 16, wherein four arms of the plurality of arms are disposed between the central body and the light assembly.

18. The lamp of claim 16, wherein two arms of the plurality of arms are disposed between the central body and the light assembly.

19. The lamp of claim 1, wherein each extraction feature has an aspect ratio of between about 0.25 and about 29.

20. The lamp of claim 1, wherein each extraction feature has an aspect ratio of between about 0.5 and about 10.

21. The lamp of claim 1, wherein each extraction feature has an aspect ratio of between about 0.75 and about 7.5.

22. The lamp of claim 1, wherein the waveguide body creates a beam angle of emitted light between less than 5 degrees to greater than 60 degrees.

23. The lamp of claim 1, wherein the waveguide body creates a beam angle of emitted light between about 5 degrees and about 50 degrees.

24. The lamp of claim 1, wherein the waveguide body creates a beam angle of emitted light between about 6 degrees and about 40 degrees.

25. The lamp of claim 1, wherein the waveguide body is substantially circular.

26. The lamp of claim 1, wherein the waveguide body is a non-circular shape.

27. The lamp of claim 1, in combination with a luminaire including a trim ring having an aperture having a first cross sectional size and wherein the waveguide body has a second cross sectional size and wherein the first cross sectional size of the aperture is less than or equal to the second cross sectional size of the waveguide body, the waveguide body comprising a plurality of extraction features in the second surface arranged such that light emitted at radially outward portions of the first surface are directed axially inwardly at an inward less than or equal to the second cross sectional size of the waveguide body.

28. The combination of claim 27, wherein the second cross sectional size of the aperture relative to the first cross sectional size of the waveguide body is between about 1:2 and about 1:4.

29. The lamp of claim 1, wherein the interior coupling cavity is defined by a wall, the interior cavity being tapered.

30. The lamp of claim 29, wherein the wall of the interior coupling cavity comprises a plurality of facets.

31. The lamp of claim 30, wherein a V-shaped groove extends into the waveguide body from the first surface.

32. The lamp of claim 31, further including lenslets disposed on the first surface.

33. The lamp of claim 32, further including additional extraction features disposed on the first surface.

34. The lamp of claim 33, wherein the additional extraction features comprise ribs.

35. The lamp of claim 1, wherein the plurality of extraction features comprise a plurality of prisms.

36. The lamp of claim 35, wherein the plurality of prisms are identical to one another and face the interior coupling cavity.

37. The lamp of claim 35, wherein the plurality of prisms are different from one another.

38. The lamp of claim 1, wherein the plurality of extraction features are substantially identical to one another.

39. The lamp of claim 1, wherein the plurality of extraction features are different from one another.

* * * * *

UNITED STATES PATENT AND TRADEMARK OFFICE
CERTIFICATE OF CORRECTION

PATENT NO. : 10,408,986 B2
APPLICATION NO. : 15/443660
DATED : September 10, 2019
INVENTOR(S) : Yuan et al.

Page 1 of 1

It is certified that error appears in the above-identified patent and that said Letters Patent is hereby corrected as shown below:

In the Claims

Column 20, Line 57, Claim 19: Please correct "29" to read -- 20 --

Column 21, Lines 8-17: Please delete Claim 27 and replace with:
The lamp of claim 1, in combination with a luminaire including a trim ring having an aperture having a first cross sectional size and wherein the waveguide body has a second cross sectional size and wherein the first cross sectional size of the aperture is less than or equal to the second cross sectional size of the waveguide body.

Signed and Sealed this
Third Day of December, 2019

Andrei Iancu
*Director of the United States Patent and Trademark Office*